(12) United States Patent
Gharbi et al.

(10) Patent No.: US 12,079,957 B2
(45) Date of Patent: Sep. 3, 2024

(54) MODELING CONTINUOUS KERNELS TO GENERATE AN ENHANCED DIGITAL IMAGE FROM A BURST OF DIGITAL IMAGES

(71) Applicant: Adobe Inc., San Jose, CA (US)

(72) Inventors: Michael Gharbi, San Francisco, CA (US); Camille Biscarrat, Cambridge, MA (US)

(73) Assignee: Adobe Inc., San Jose, CA (US)

( * ) Notice: Subject to any disclaimer, the term of this patent is extended or adjusted under 35 U.S.C. 154(b) by 420 days.

(21) Appl. No.: 17/582,266

(22) Filed: Jan. 24, 2022

(65) Prior Publication Data
US 2023/0237628 A1   Jul. 27, 2023

(51) Int. Cl.
*G06K 9/00*   (2022.01)
*G06N 3/08*   (2023.01)
(Continued)

(52) U.S. Cl.
CPC ............... *G06T 5/50* (2013.01); *G06N 3/08* (2013.01); *G06T 7/337* (2017.01);
(Continued)

(58) Field of Classification Search
CPC . G06T 2207/20212; G06T 2207/20216; G06T 2207/20221; G06T 3/4076;
(Continued)

(56) References Cited

U.S. PATENT DOCUMENTS 11,842,460 B1 * 12/2023 Chen .................... G06T 5/60
2002/0135683 A1 * 9/2002 Tamama ............ H04N 25/136
348/346
(Continued)

OTHER PUBLICATIONS

M. Aittala and F. Durand. Burst image deblurring using permutation invariant convolutional neural networks. In Proceedings of the European Conference on Computer Vision (ECCV), pp. 731-747, 2018.
(Continued)

*Primary Examiner* — Atiba O Fitzpatrick
(74) *Attorney, Agent, or Firm* — Keller Preece PLLC

(57) ABSTRACT

The present disclosure relates to systems, methods, and non-transitory computer readable media that utilize a continuous kernel neural network that learns continuous reconstruction kernels to merge digital image samples in local neighborhoods and generate enhanced digital images from a plurality of burst digital images. For example, the disclosed systems can utilize an alignment model to align image samples from burst digital images to a common coordinate system (e.g., without resampling). In some embodiments, the disclosed systems generate localized latent vector representations of kernel neighborhoods and determines continuous displacement vectors between the image samples and output pixels of the enhanced digital image. The disclosed systems can utilize the continuous kernel network together with the latent vector representations and continuous displacement vectors to generated learned kernel weights for combining the image samples and generating an enhanced digital image.

20 Claims, 13 Drawing Sheets

(51) Int. Cl.
*G06T 5/50* (2006.01)
*G06T 7/33* (2017.01)

(52) U.S. Cl.
CPC .............. *G06T 2207/20081* (2013.01); *G06T 2207/20084* (2013.01); *G06T 2207/20212* (2013.01)

(58) Field of Classification Search
CPC .... G06T 5/60; G06T 5/00; G06T 5/73; G06T 5/75; G06T 3/4053; G06T 2207/20201; G06T 2207/20172; G06T 2207/20182; G06T 2207/20192; G06T 7/33; G06T 7/337; G06T 7/30; G06T 7/344; G06T 3/0068; G06T 2207/20081; G06T 2207/20084; G06V 20/653; G06V 10/754; G06V 10/87; G06V 30/19113; G06V 10/7753; G06V 10/70; G06V 10/82; G06V 10/774–7796; G06N 3/045; G06N 3/02–126; G06N 20/00–20; G06K 9/6256; G06K 9/6257; G06K 9/6259; G06F 18/214–2155; G06F 7/023; G06F 40/16

See application file for complete search history.

(56) References Cited

U.S. PATENT DOCUMENTS

| | | | |
|---|---|---|---|
| 2010/0014733 A1* | 1/2010 | Vija | G06T 5/50 382/131 |
| 2015/0348242 A1* | 12/2015 | Molgaard | G06T 5/70 348/241 |
| 2016/0140697 A1* | 5/2016 | Sugimoto | G06T 5/50 348/241 |
| 2016/0292825 A1* | 10/2016 | Rezaiifar | G06F 18/23 |
| 2017/0064204 A1* | 3/2017 | Sapiro | G06T 5/20 |
| 2022/0122223 A1* | 4/2022 | Choi | G06T 5/70 |
| 2022/0207652 A1* | 6/2022 | Garcia-Dorado | G06T 3/4053 |
| 2022/0405980 A1* | 12/2022 | Karras | G06T 9/005 |
| 2023/0186432 A1* | 6/2023 | Choi | G06T 5/60 382/156 |

OTHER PUBLICATIONS

G. Bhat, M. Danelljan, L. Van Gool, and R. Timofte. Deep burst super-resolution. In Proceedings of the IEEE/CVF Conference on Computer Vision and Pattern Recognition, pp. 9209-9218, 2021.
Y. Chen, S. Liu, and X. Wang. Learning continuous image representation with local implicit image function. In Proceedings of the IEEE/CVF Conference on Computer Vision and Pattern Recognition, pp. 8628-8638, 2021.
W. Cho, S. Son, and D.-S. Kim. Weighted multi-kernel prediction network for burst image super-resolution. In Proceedings of the IEEE/CVF Conference on Computer Vision and Pattern Recognition, pp. 404-413, 2021.
M. Delbracio and G. Sapiro. Burst deblurring: Removing camera shake through fourier burst accumulation. In Proceedings of the IEEE Conference on Computer Vision and Pattern Recognition, pp. 2385-2393, 2015.
C. Godard, K. Matzen, and M. Uyttendaele. Deep burst denoising. In Proceedings of the European Conference on Computer Vision (ECCV), pp. 538-554, 2018.
S. W. Hasinoff, D. Sharlet, R. Geiss, A. Adams, J. T. Barron, F. Kainz, J. Chen, and M. Levoy. Burst photography for high dynamic range and low-light imaging on mobile cameras. ACM Transactions on Graphics (ToG), 35(6):1-12, 2016.
O. Liba, K. Murthy, Y.-T. Tsai, T. Brooks, T. Xue, N. Karnad, Q. He, J. T. Barron, D. Sharlet, R. Geiss, et al. Handheld mobile photography in very low light. ACM Transactions on Graphics (TOG), 38(6):1-16, 2019.
I. Mehta, M. Gharbi, C. Barnes, E. Shechtman, R. Ramamoorthi, and M. Chandraker. Modulated periodic activations for generalizable local functional representations. arXiv preprint arXiv:2104.03960, 2021.
B. Mildenhall, J. T. Barron, J. Chen, D. Sharlet, R. Ng, and R. Carroll. Burst denoising with kernel prediction networks. In Proceedings of the IEEE Conference on Computer Vision and Pattern Recognition, pp. 2502-2510, 2018.
B. Mildenhall, P. P. Srinivasan, M. Tancik, J. T. Barron, R. Ramamoorthi, and R. Ng. Nerf: Representing scenes as neural radiance fields for view synthesis. In European conference on computer vision, pp. 405-421. Springer, 2020.
C. R. Qi, H. Su, K. Mo, and L. J. Guibas. Pointnet: Deep learning on point sets for 3d classification and segmentation. In Proceedings of the IEEE conference on computer vision and pattern recognition, pp. 652-660, 2017.
V. Sitzmann, J. Martel, A. Bergman, D. Lindell, and G. Wetzstein. Implicit neural representations with periodic activation functions. Advances in Neural Information Processing Systems, 33, 2020.
M. Tancik, P. P. Srinivasan, B. Mildenhall, S. Fridovich-Keil, N. Raghavan, U. Singhal, R. Ramamoorthi, J. T. Barron, and R. Ng. Fourier features let networks learn high frequency functions in low dimensional domains. arXiv preprint arXiv:2006.10739, 2020.
B. Wronski, I. Garcia-Dorado, M. Ernst, D. Kelly, M. Krainin, C.-K. Liang, M. Levoy, and P. Milanfar. Handheld multi-frame super-resolution. ACM Transactions on Graphics (TOG), 38(4):1-18, 2019.
Z. Xia, F. Perazzi, M. Gharbi, K. Sunkavalli, and A. Chakrabarti. Basis prediction networks for effective burst denoising with large kernels. In Proceedings of the IEEE/CVF Conference on Computer Vision and Pattern Recognition, pp. 11844-11853, 2020.

* cited by examiner

MODELING CONTINUOUS KERNELS TO GENERATE AN ENHANCED DIGITAL IMAGE FROM A BURST OF DIGITAL IMAGES

BACKGROUND

Recent years have seen significant advancements in computer-implemented models for capturing and generating digital images. For example, conventional systems can utilize digital cameras to capture digital images and then process the digital images to generate a high-resolution image output. Thus, for example, a smartphone can capture a series of digital images (also known as a "burst") and then combine the series of digital images to generate an improved output digital image. Although conventional systems can generate a digital image from a set of input digital images, these systems continue to suffer from a number of technical deficiencies, particularly in accuracy, flexibility, and efficiency of implementing computing devices.

For example, conventional imaging systems are often inflexible and inaccurate. To illustrate, some conventional systems generate and utilize discrete kernels to combine digital images. Accordingly, conventional systems are often required to resample (e.g., upsample or downsample) digital image inputs to match the discrete kernel architecture. For example, conventional systems interpolate and project input pixels into a grid to align to the discrete kernel. This rigid architecture and corresponding upsampling/downsampling process result in lost information integrity from the input digital images and undermines the quality and accuracy of output digital images.

Some conventional systems analyze the local structure of images gradients to generate Gaussian kernels used to combine digital images. These conventional systems are also inflexible because they are limited to the Gaussian form/shape. This rigid limitation undermines accuracy and the ability for conventional systems to adapt kernels to fit any particular digital image context. Indeed, the Gaussian form is sub-optimal in a variety of contexts, such as occlusions.

Other conventional systems utilize implicit neural representations to learn underlying continuous scene functions from a collection of digital image samples. These systems can sample from the continuous reconstruction of the underlying scene to generate an output digital image. Such conventional systems are often inflexible in that they learn a single scene per network and do not generalize well to other scenes. Moreover, the model architecture for continuous scene reconstruction requires significant computing resources (e.g., processing power and memory requirements).

SUMMARY

This disclosure describes one or more embodiments of systems, methods, and non-transitory computer readable media that solve one or more of the foregoing or other problems in the art with a continuous kernel neural network that learns continuous reconstruction kernels to merge digital image samples in local neighborhoods and generate enhanced digital images from a plurality of burst digital images. In particular, the disclosed systems can utilize a burst image reconstruction algorithm that preserves individual samples from the raw burst frames (without resampling). In one or more embodiments, the disclosed systems considers the captured scene as a continuous function, where each frame from the burst is a noisy, regular sampling of the underlying continuous scene. The disclosed systems can learn a mapping from the set of scene samples in the burst to a continuous representation of kernels and produce an output image by resampling this reconstruction at any chosen resolution. Indeed, instead of learning the scene directly, the disclosed systems can learn continuous reconstruction kernels that are used to merge the samples in local neighborhoods. This makes the reconstruction local, efficient, and well-behaved: output pixels are constrained to be a combination of the input samples. The disclosed systems can represent the kernels themselves using neural implicits, conditioned on the samples. Learning the kernels, the disclosed systems can better handle noise, residual misalignments (due to error in the frame registration step, or scene motion), chromatic and other lens aberrations, and better adapt to the local image information. The disclosed systems can benefit several imaging needs including denoising, super-resolution, de-blurring, dynamic range expansion for both mobile and desktop applications.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure describes one or more embodiments of the invention with additional specificity and detail by referencing the accompanying figures. The following paragraphs briefly describe those figures, in which.

DETAILED DESCRIPTION

Figure 1:
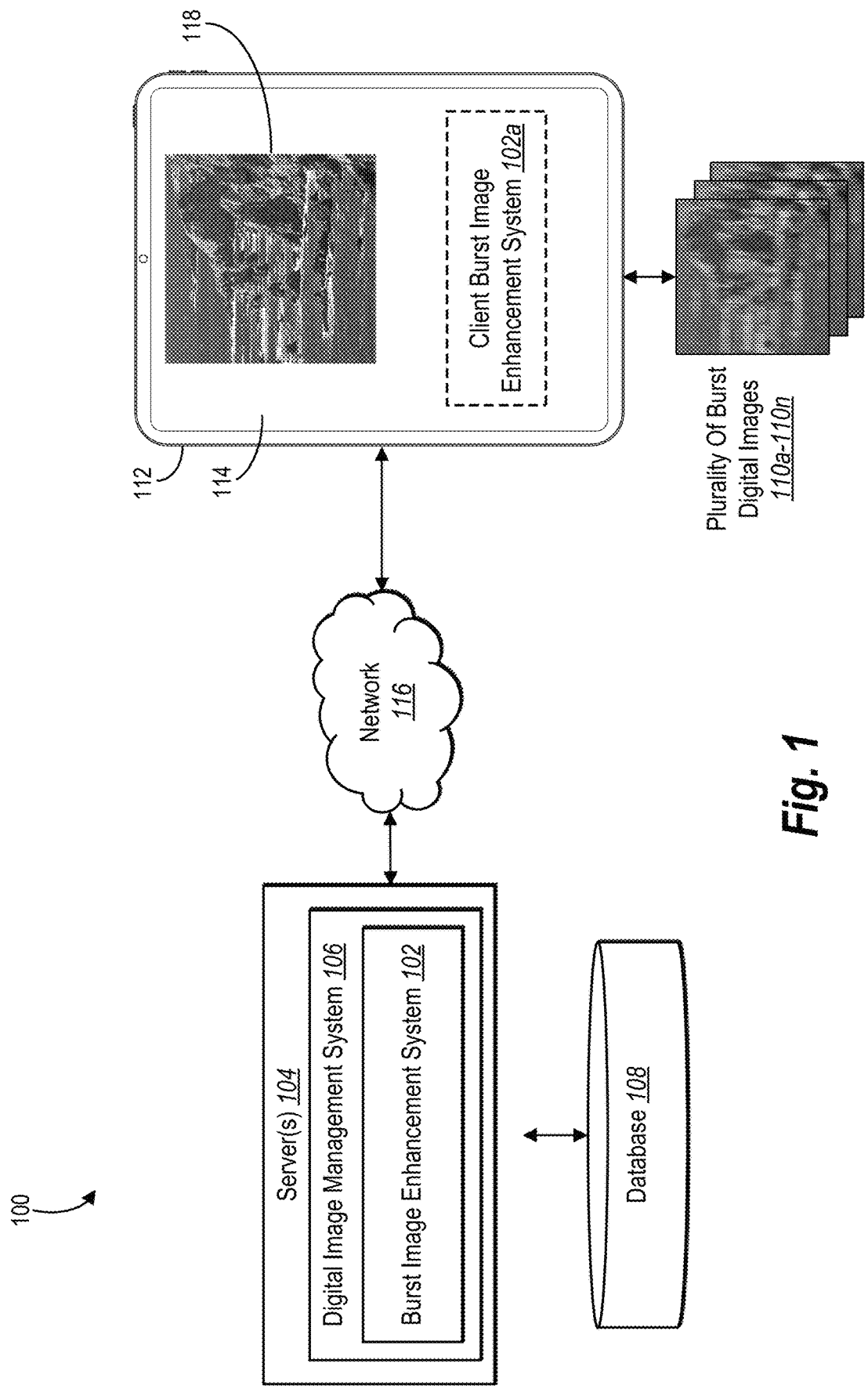
FIG. 1 illustrates an example system environment in which a burst image enhancement system operates in accordance with one or more embodiments.

This disclosure describes one or more embodiments of a burst image enhancement system that utilizes a continuous kernel neural network to model continuous reconstruction kernels and generate enhanced digital images from a plurality (i.e., a burst) of digital images. For example, the burst image enhancement system aligns a plurality of input frames in a burst of digital images to a common coordinate system utilizing an alignment model. Notably, the burst image enhancement system can preserve the raw input samples (i.e., without resampling the burst digital images). The burst image enhancement system utilizes these samples together with an embedding neural network (e.g., latent code) to estimate a hidden latent variable that conditions a continuous kernel neural network (e.g., a local implicit network) for modeling a reconstruction kernel. The burst image enhancement system generates an enhanced digital image by applying the continuous reconstruction kernels to local sample neighborhoods.

As just mentioned, in one or more embodiments the burst image enhancement system utilizes an alignment model to align a burst of digital images. For example, the burst image enhancement system can sample the burst digital images and utilize the alignment model to align these samples to a common coordinate system. Thus, the burst image enhancement system can utilize this alignment model to generate irregularly spaced samples that contain the image information of the burst (e.g., without losing information to upsampling/downsampling procedures).

In one or more embodiments, the burst image enhancement system also generates latent representations from the burst digital images. For example, the burst image enhancement system can utilize an embedding neural network (e.g., latent encoder) to generate latent vector representations corresponding to localized areas of the burst digital images (e.g., from the image samples). Thus, for localized kernel neighborhoods (e.g., neighborhoods surrounding a particular output pixel), the burst image enhancement system generates latent vector representations that reflect contextual information such as geometry of the image samples, presence of edges, level of detail, etc.

As mentioned above, in one or more embodiments the burst image enhancement system also models continuous reconstruction kernels utilizing a continuous kernel neural network and samples the continuous kernel representations at a desired resolution to generate an enhanced digital image. For example, the burst image enhancement system utilizes the continuous kernel neural network to model non-Gaussian continuous reconstruction kernels for individual kernel neighborhoods around output pixels for the enhanced digital image. For each kernel neighborhood around an output pixel, the continuous kernel neural network generates learned kernel weights (e.g., a scalar contribution) for samples within the kernel neighborhood. Specifically, the continuous kernel neural network generates these learned kernel weights conditioned on the latent representation of the kernel neighborhood and based on a continuous displacement vector between the output pixel and samples within the kernel neighborhood.

In one or more embodiments, the burst image enhancement system utilizes the learned kernel weights to generate output pixels and an enhanced digital image. For example, the burst image enhancement system combines samples from the burst digital images for each kernel neighborhood corresponding to an output pixel utilizing the learned kernel weights. The burst image enhancement system then combines the output pixels to generate an enhanced digital image. Notably, because the burst image enhancement system can sample from continuous reconstruction kernels, the burst image enhancement system can flexibly accommodate a variety of input resolutions and generate a digital image at a variety of different output resolutions.

In one or more embodiments, the burst image enhancement system also learns parameters of the neural network architecture for generating an enhanced digital image (e.g., the embedding neural network and/or the continuous kernel neural network). For example, the burst image enhancement system can apply synthetic transformations to a ground truth digital image to generate synthetic burst digital images. Moreover, the burst image enhancement system can utilize the synthetic burst digital images and the ground truth digital image to learn model parameters utilizing a supervised training approach.

In some embodiments, the burst image enhancement system utilizes authentic (e.g., non-synthetic) burst digital images to learn model parameters. For example, the burst image enhancement system can divide a plurality of burst digital images into a training set and one or more reference digital images. The burst image enhancement system can then utilize the training set to generate a predicted digital image. Moreover, the burst image enhancement system can compare the predicted digital image and the one or more reference digital images to modify parameters of the neural network architecture. In some implementations, the burst image enhancement system utilizes both authentic burst digital images and synthetic burst digital images to learn model parameters.

As mentioned above, conventional systems have a number of technical shortcomings with regard to accuracy, security, flexibility, and efficiency. Embodiments of the burst image enhancement system can provide a variety of advantages over these conventional systems. For example, the burst image enhancement system can improve accuracy and flexibility. Indeed, in contrast to conventional systems that resample digital images to match discrete kernels, the burst image enhancement system models continuous kernel representations and generates learned kernel weights from these continuous kernel representations. Thus, unlike these conventional systems, where the output resolution is limited by the discrete kernel resolution, the burst image enhancement system can dynamically select different output resolutions by sampling from continuous kernel representations. Moreover, by utilizing samples directly from burst digital images the burst image enhancement system can improve accuracy and quality. Indeed, the burst image enhancement system avoids loss of information associated with resampling processes (e.g., upsampling/downsampling) to fit discrete kernels.

In addition, the burst image enhancement system can also improve flexibility and accuracy relative to conventional systems that generate Gaussian kernels to combine digital images. Indeed, the burst image enhancement system can learn a variety of kernel shapes, not limited to the Gaussian form. This allows the burst image enhancement system to determine continuous kernel shapes that flexibly and accurately align the particular context of burst digital images portraying a scene and/or neighborhood within these burst digital images. Indeed, by not restricting the kernel shape (and learning the kernel shape instead), the burst image enhancement system can better capture local information and learn more complex and efficient reconstruction filters.

Furthermore, the burst image enhancement system can improve flexibility and efficiency relative to conventional systems that reconstruct underlying image scenes. Indeed, as mentioned above, the burst image enhancement system can utilize neural implicits to represent kernels instead of the underlying image signal directly. This simplifies the learning problem, leading to more compact models and utilization of significantly fewer computing resources (e.g., computer processing power and memory). Moreover, this approach leads to better generalization and flexibility, as the model is not tied to a single scene.

In sum, the burst image enhancement system 102 can produce a continuous representation of a scene, which can be resampled at any resolution. Accordingly, the burst image enhancement system 102 is useful for demosaicking, super-resolution, and other applications that may require more or less pixels. The burst image enhancement system 102 can use learned kernels to reconstruct images from a burst. Because the kernels are learned, they can adapt to local image content and be robust to errors due to occlusion (scene motion) or misalignments (errors in the frame registration algorithm). Furthermore, the kernels are conditioned on the local image content, so they can adapt to the local image structure (e.g. large blur kernels for smooth areas, fine anisotropic kernels where details need to be preserved).

As suggested by the foregoing discussion, this disclosure utilizes a variety of terms to describe features and benefits of the burst image enhancement system. Additional detail is hereafter provided regarding the meaning of these terms as used in this disclosure. For example, the term "digital image" refers to a digital visual representation. For instance, a digital image can include a set of pixels that, when combined, form a visual representation. Thus, "burst digital images" refer to a set of digital images portraying a scene. In particular, burst digital images can include a series of digital images captured within a time window (e.g., within one second or ten seconds) that portray a scene (e.g., a person, thing, or place). An enhanced digital image refers to a digital image generated from one or more burst digital images. Moreover, an output pixel (sometimes referred to as target output pixel or target pixel) refers to a pixel of the enhanced digital image.

In one or more embodiments, the burst image enhancement system generates image samples from burst digital images. As used herein, the term "image sample" (or "sample") refers to a portion (e.g., a pixel) extracted, identified, or taken from a digital image (e.g., from a burst digital image). In particular, an image sample, includes a sampled portion of a digital image that is not resampled (e.g., not upsampled or downsampled). In some implementations, the burst image enhancement system generates samples by aligning burst digital images to a common coordinate system and sampling (e.g., without resampling).

As mentioned above, the burst image enhancement system can utilize one or more machine learning models, such as a neural network, to generate an enhanced digital image. As used herein the term "neural network" refers to a model of interconnected artificial neurons (e.g., organized in layers having learned parameters or weights) that communicate and learn to approximate complex functions. In some cases, a neural network refers to an algorithm (or set of algorithms) that implements deep learning techniques to model high-level abstractions in data. For example, a neural network can include a convolutional neural network, a recurrent neural network (e.g., an LSTM), a graph neural network, or a generative adversarial neural network.

As discussed, the burst image enhancement system can utilize an embedding neural network and/or a continuous kernel neural network. As used herein, the term "embedding neural network" refers to a neural network that generates an embedding (e.g., latent vector representation) of input data. For example, an embedding neural network can generate a latent vector representation (e.g., a hidden or internal code) of one or more burst digital images. Similarly, an embedding neural network can generate a latent vector representation of one or more subportions (e.g., kernel neighborhoods) for one or more burst digital images.

As used herein, the term "continuous kernel neural network" refers to a neural network that models continuous kernels for one or more burst digital images. In particular, a continuous kernel neural network can include a neural network that generates learned kernel weights (from one or more learned continuous kernel representations). A continuous kernel neural network can utilize latent representations of a kernel neighborhood and continuous displacement vectors for samples to generate learned kernel weights for combining the samples and generating an output pixel. Additional detail regarding various implementations of a continuous kernel neural network are provided below.

As used herein, the term "kernel neighborhood" refers to a neighborhood, region, or area. In particular, a kernel neighborhood refers to a region surrounding an output pixel within a coordinate system. The burst image enhancement system can generate learned kernel weights for samples of burst digital images falling within a kernel neighborhood and apply the learned kernel weights to generate the output pixel.

As used herein, the term "learned kernel weight" or "learned pixel weight" (e.g., non-Gaussian kernel weight) refers to a weight sampled from a continuous kernel modeled by the continuous kernel neural network. For example, learned kernel weights can include weights sampled from a non-Gaussian kernel representation and utilized to combine samples from one or more burst digital images. Thus, a learned kernel weight for a sample can include a weight sampled from a continuous (non-Gaussian) kernel representation corresponding to the position of the image sample relative to an output pixel.

As mentioned above, the burst image enhancement system can generate learned kernel weights from a continuous displacement vector. As used herein, the term "continuous displacement vector" refers to a continuous digital representation of relative position (e.g., that is not limited to discrete or whole values). Indeed, as mentioned above, conventional systems rely on discrete kernels (e.g., with 3×3 or 11×11 pre-defined positions). As used herein, the term "discrete" refers to a count that involves particular integers (e.g., a limited number of possible values). Thus, conventional systems utilize kernels limited to particular positions (e.g., cells or pixels within a 3×3 grid). The term "continuous" refers to data or a variable that is not limited to integers (e.g., includes an unspecified number of possible measurements). Thus, a continuous displacement vector is not limited to particular cells or positions within a defined grid but can reflect an unspecified number of possible distances (e.g., 3.4 pixels or 8.75 pixels) relative to an output pixel.

Additional detail regarding the burst image enhancement system will now be provided with reference to the figures. For example, FIG. 1 illustrates a schematic diagram of an example system environment (or "environment") 100 for implementing a burst image enhancement system 102 in accordance with one or more embodiments. An overview of the burst image enhancement system 102 is described in relation to FIG. 1. Thereafter, a more detailed description of the components and processes of the burst image enhancement system 102 is provided in relation to the subsequent figures.

As shown, the environment 100 includes server(s) 104, a database 108, a client device 112, and a network 116. Each of the components of the environment communicate via the network 116, and the network 116 is any suitable network over which computing devices communicate. Example networks are discussed in more detail below in relation to FIG. 12.

As mentioned, the environment 100 includes a client device 112. The client device 112 is one of a variety of computing devices, including a smartphone, a tablet, a smart television, a desktop computer, a laptop computer, a virtual reality device, an augmented reality device, or another computing device as described in relation to FIG. 12. Although FIG. 1 illustrates a single instance of the client device 112, in some embodiments, the environment 100 includes multiple different client devices, each associated with a different user.

The client device 112 communicates with the server(s) 104 via the network 116. For example, the client device 112 provides information to server(s) 104 indicating burst digital images 110a-110n and/or client device interactions (e.g., digital image selections, user interactions with one or more pixels of a digital image, or other input) and receives information from the server(s) 104 such as an enhanced digital image 118. Thus, in some cases, the burst image enhancement system 102 implemented via the server(s) 104 provides and receives information based on client device interaction via the client device 112. The client device 112 can also include a digital image capturing device (e.g., a digital camera). Thus, the client device 112 can capture, process, revise, manipulate, and/or transfer digital images, such as the plurality of burst digital images 110a-110n. Moreover, the client device 112 can display (via a user interface) the plurality of burst digital images 110a-110n and/or the enhanced digital image 118.

As shown in FIG. 1, the client device 112 includes a client application 114. In particular, the client application 114 is a web application, a native application installed on the client device 112 (e.g., a mobile application, a desktop application, etc.), or a cloud-based application where all or part of the functionality is performed by the server(s) 104. Based on instructions from the client application 114, the client device 112 presents or displays information to a user, including digital images (e.g., the burst digital images 110a-110n and/or the enhanced digital image 118).

As illustrated in FIG. 1, the environment 100 includes the server(s) 104. The server(s) 104 generates, tracks, stores, processes, receives, and transmits electronic data, such as digital images. For example, the server(s) 104 receives data from the client device 112 in the form of a plurality of burst digital images. In response, the server(s) 104 transmits data to the client device 112 to cause the client device 112 to display or present an enhanced digital image.

In some embodiments, the server(s) 104 communicates with the client device 112 to transmit and/or receive data via the network 116. In some embodiments, the server(s) 104 comprises a distributed server where the server(s) 104 includes a number of server devices distributed across the network 116 and located in different physical locations. The server(s) 104 can comprise a content server, an application server, a communication server, a web-hosting server, a multidimensional server, or a machine learning server. The server(s) 104 can further access and utilize the database 108 to store and retrieve information such as digital images.

As further shown in FIG. 1, the server(s) 104 also includes the burst image enhancement system 102 as part of a digital image management system 106. For example, in one or more implementations, the digital image management system 106 can store, generate, modify, edit, enhance, provide, distribute, and/or share digital content, such as digital images. For example, the digital image management system 106 provides tools for the client device 112, via the client application 114, to display or manipulate pixels of digital images. In some implementations, the digital image management system 106 provides tools for refining digital images.

In one or more embodiments, the server(s) 104 includes all, or a portion of, the burst image enhancement system 102. For example, the burst image enhancement system 102 operates on the server(s) 104 to generate/provide the enhanced digital image 118, utilize one or more neural networks, and/or train one or more neural networks (e.g., an embedding neural network and/or a continuous kernel neural network).

In certain cases, the client device 112 includes all or part of the burst image enhancement system 102. Indeed, as illustrated, the client device 112 can include a client burst image enhancement system 102a with the same or similar functionality to the burst image enhancement system 102. For example, the client device 112 can capture digital images, apply one/or more neural networks (e.g., an embedding neural network and/or continuous kernel neural network), and generate enhanced digital images. In some embodiments, the client burst image enhancement system 102a includes a web hosting application that allows the client device 112 to interact with the server(s) 104. To illustrate, in one or more implementations, the client device 112 accesses a web page supported and/or hosted by the server(s) 104.

In some embodiments, the burst image enhancement system 102 trains one or more neural networks (e.g., the embedding neural network and/or the continuous kernel neural network) via the server(s) 104. The server(s) 104 can provide the embedding neural network and/or the continuous kernel neural network to the client device 112 for generating enhanced digital images. In other embodiments, the server(s) 104 both train and implement the embedding neural network and/or the continuous kernel neural network. For example, the server(s) 104 can receive the burst digital images 110a-110n from the client device 112, generate the enhanced digital image 118, and provide the enhanced digital image 118 to the client device 112 for display.

Figure 2:
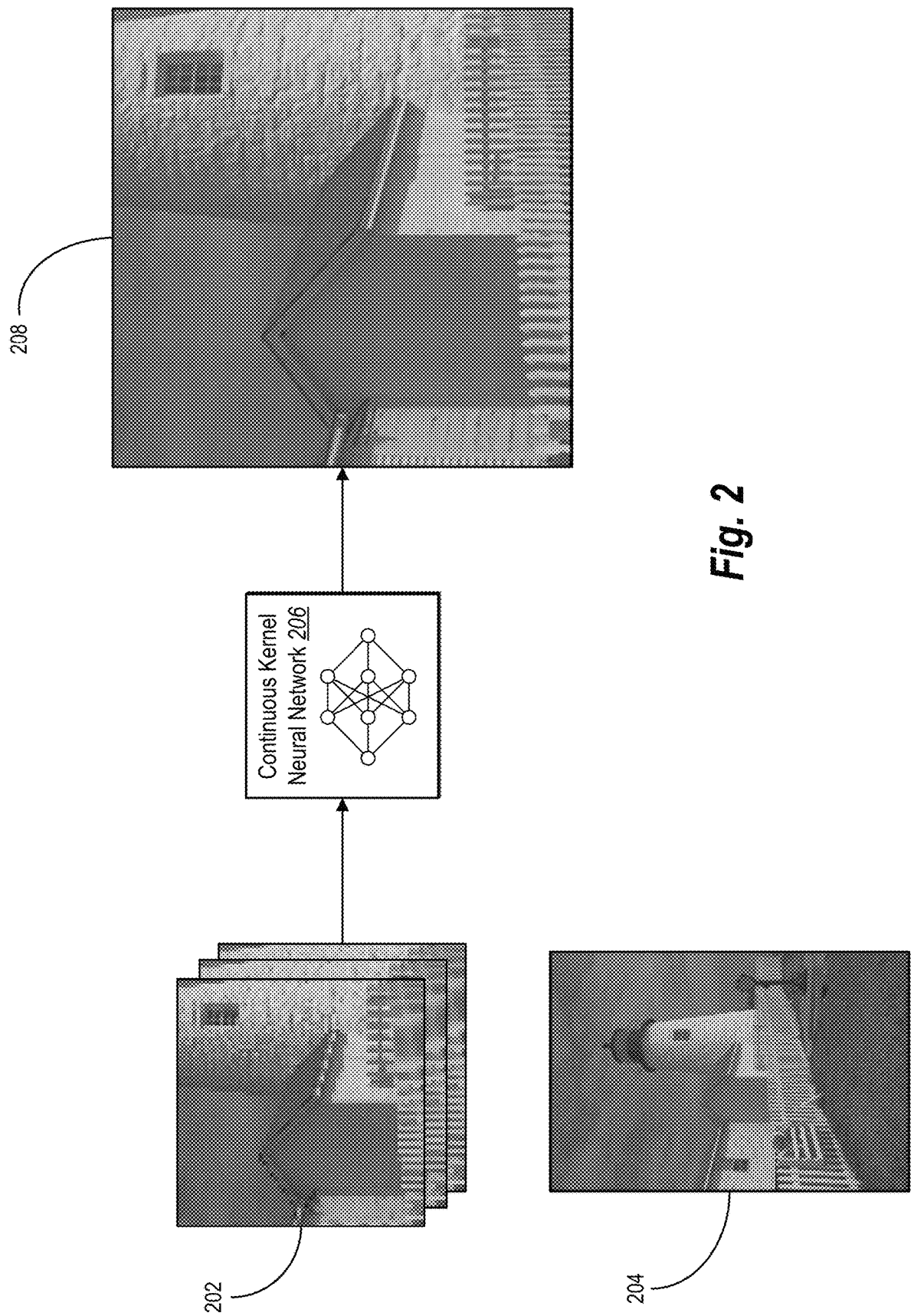
FIG. 2 illustrates an overview of generating an enhanced digital image from burst digital images utilizing a continuous kernel neural network in accordance with one or more embodiments.

FIG. 2 illustrates the burst image enhancement system 102 generating an enhanced digital image 208 from burst digital images 202 in accordance with one or more embodiments. Specifically, FIG. 2 illustrates the burst image enhancement system 102 utilizing a continuous kernel neural network 206 to generate the enhanced digital image 208.

The burst image enhancement system 102 can capture and process a plurality of burst digital images 202 portraying a scene 204 (e.g., a reference continuous scene). For example, the burst image enhancement system 102 can utilize a digital camera to capture the burst digital images 202, where each digital image portrays a different representation of the scene 204. To illustrate, a first digital image may portray a first portion of the scene 204, a second digital image may portray a second portion of the scene 204. Moreover, each of the burst digital images may contain different artifacts, such as blurring, occlusions, granularities, etc. The burst digital images may also include low-resolution digital images, where a higher-resolution (e.g., enhanced) digital image is desired.

As shown, the burst image enhancement system 102 utilizes the continuous kernel neural network 206 to generate the enhanced digital image 208. In particular, the burst image enhancement system 102 can align image samples drawn from the burst digital images 102a-102n utilizing an alignment algorithm. In this manner, the burst image enhancement system 102 can align image samples to a common coordinate system despite the different perspectives and artifacts of each digital image in the burst. Additional detail regarding aligning digital images utilizing an alignment algorithm is provided below (e.g., in relation to FIG. 3).

Upon aligning the image samples, the burst image enhancement system 102 can utilize the continuous kernel neural network 206 to determine learned kernel weights and reconstruct output pixels of the enhanced digital image 208. In particular, the burst image enhancement system 102 can utilize an embedding neural network (e.g., either a separate neural network or a sub-network of the continuous kernel neural network 206) to generate latent vector representations from the burst digital images 202. For example, the burst image enhancement system 102 can utilize the embedding neural network to generate latent code representations for localized kernel neighborhoods for each output pixel of the enhanced digital image from the samples. Additional detail regarding the embedding neural network and latent representations is provided below (e.g., in relation to FIG. 4).

The burst image enhancement system 102 can utilize the latent representations and continuous displacement vectors to generate learned kernel weights for each kernel neighborhood. In particular, the burst image enhancement system 102 can determine continuous displacement vectors between each output pixel and samples within a corresponding kernel neighborhood. The burst image enhancement system 102 can feed the displacement vectors for the kernel neighborhood and a latent representation for the kernel neighborhood to the continuous kernel neural network 206 to generate learned kernel weights for each sample. The burst image enhancement system 102 can then combine the samples utilizing the learned kernel weights to generate an output pixel. By combining output pixels, the burst image enhancement system 102 can generate the enhanced digital image 208 at a desired resolution. Additional detail regarding continuous displacement vectors, generating learned kernel weights, and combining samples to generate output pixels and enhanced digital images is provided below (e.g., in relation to FIGS. 5-6).

Figure 3:
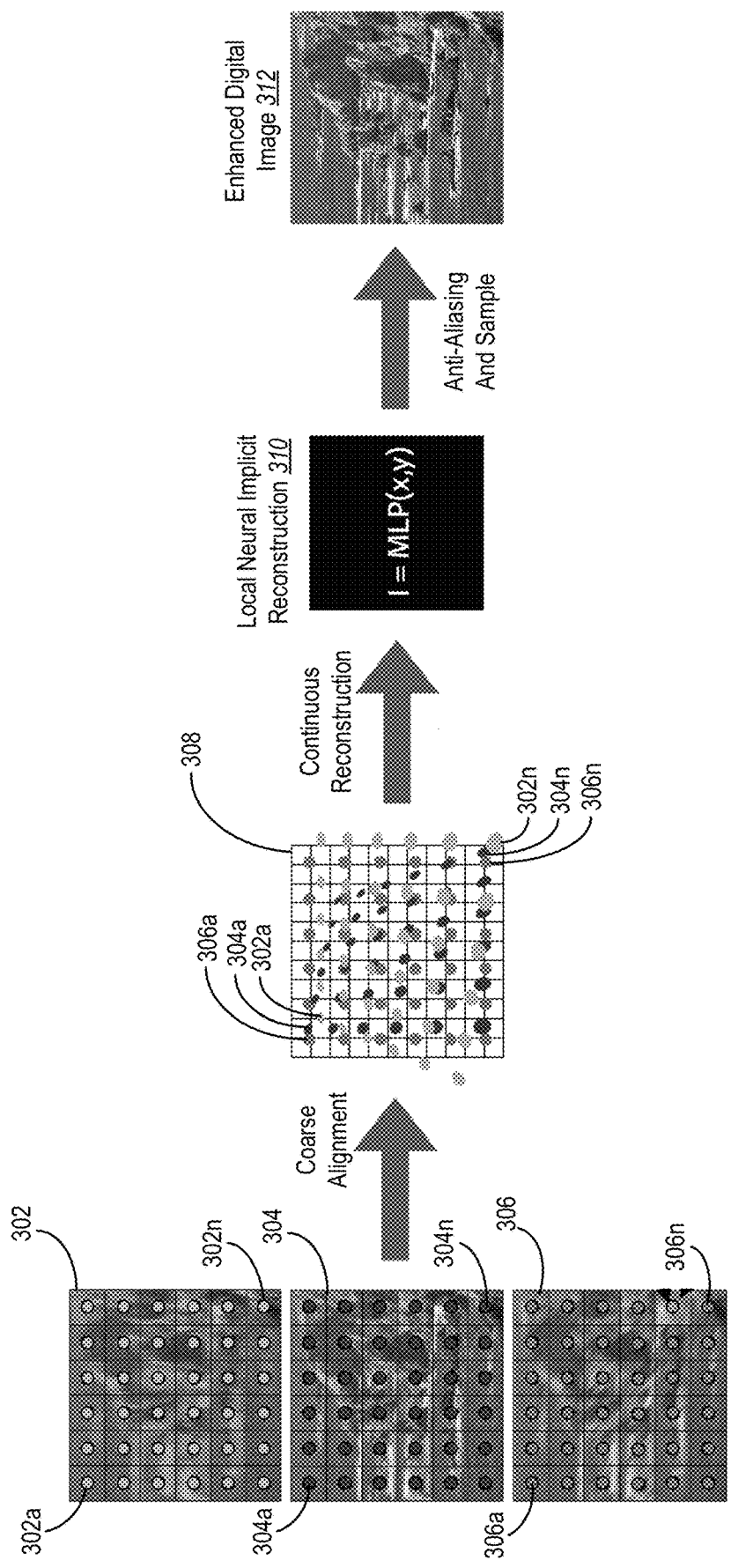
FIG. 3 illustrates a schematic diagram of the burst image enhancement system utilizing aligned digital image samples and a continuous kernel neural network to generate an enhanced digital image in accordance with one or more embodiments.

As mentioned above, FIG. 3 illustrates additional detail regarding aligning samples of burst digital images and generating an enhanced digital image utilizing a continuous kernel neural network in accordance with one or more embodiments. Specifically, FIG. 3 illustrates a plurality of burst digital images, including a first digital image 302, a second digital image 304, and a third digital image 306. Each of the digital images 302-306 portray the same continuous scene (e.g., a rocky shoreline), but each digital image also includes different perspectives and artifacts (e.g., the first digital image 302 and the second digital image 304 include significant blurring).

As illustrated in FIG. 3, the burst image enhancement system 102 can extract samples from the digital images 302-306. In particular, in the embodiment illustrated in FIG. 3, the burst image enhancement system 102 divides the digital images into regions (e.g., the illustrated squares) and extracts samples from each region. Thus, the burst image enhancement system 102 generates samples 302a-302n from the first digital image 302, samples 304a-304n from the second digital image 304, and samples 306a-306n from the third digital image 306.

Although FIG. 3 illustrates a particular sampling pattern, the burst image enhancement system 102 can utilize a variety of sampling approaches. For example, the burst image enhancement system 102 can extract samples utilizing a random sampling algorithm (rather than regional sampling). Similarly, the burst image enhancement system 102 can extract samples utilizing a sampling algorithm that draws more heavily from notable portions of a digital image (e.g., from foreground objects, areas of greater detail, areas of elevated color variation, or areas with greater artifacts).

Upon identifying samples from the digital images 302-306, the burst image enhancement system 102 utilizes an alignment algorithm to align the digital images 302-306 and/or samples. For example, the burst image enhancement system 102 aligns n digital images (also referred to as frames) $f_1, \ldots, f_n$ into the same reference coordinate system. To illustrate, the burst image enhancement system 102 can utilize an alignment algorithm to align the frames into the coordinate system of the output digital image (although a different coordinate system can also be utilized). The burst image enhancement system 102 can utilize a variety of alignment algorithms. In one or more embodiments, the burst image enhancement system 102 utilizes an alignment algorithm as described by S. W. Hasinoff, D. Sharlet, R. Geiss, A. Adams, J. T. Barron, F. Kainz, J. Chen, and M. Levoy in Burst photography for high dynamic range and low-light imaging on mobile cameras, ACM Transactions on Graphics (ToG), 35(6):1-12, 2016, which is incorporated herein by reference in its entirety.

As shown in FIG. 3, by aligning the digital images 302-306, the burst image enhancement system 102 aligns the samples 302a-302n to a common coordinate system 308. This yields a collection of irregularly spaced samples that contain image information directly from the digital images 302-306. Notably, although the samples 302a-302n have been aligned to the common coordinate system 308 they have not been resampled (e.g., upsampled or downsampled). Thus, the samples 302a-302n have not lost information from the original burst digital images. The samples 302a-302n are also not placed uniformly within the common coordinate system 308. Indeed, the alignment model can align each sample to a variety of locations within a continuous space (rather than discrete, pre-defined cells).

Notably, this alignment process need not be perfect because the learnable continuous kernel can shift data to correct for small misalignments or to deal with outliers, like occlusions due to scene motion. Moreover, as illustrated, the frames can have varying exposure time, noise characteristics, etc. In particular, if the digital images 302-306 are in RAW format, the input samples represent a single color (red, green or blue). The burst image enhancement system 102 can generalize to a variety of input types, like multi-exposure sensors or polarized sensors.

In addition, although FIG. 3 illustrates sampling from the digital images 302-306 and then aligning the digital images/samples, the burst image enhancement system 102 can also utilize a different order or approach. For example, the burst image enhancement system 102 can apply the alignment algorithm to align the digital images 302-306 and then sample from the digital images 302-306 after they are aligned.

As shown in FIG. 3, the burst image enhancement system 102 utilizes aligned samples 302a-302n, 304a-304n, and 306a-306n to generate the enhanced digital image 312. In particular, the burst image enhancement system 102 performs a continuous reconstruction utilizing the samples 302a-302n, 304a-304n, and 306a-306n to generate a local neural implicit representation 310 of continuous kernels. As mentioned above, the local neural implicit representation 310 can include a (non-Gaussian) continuous kernel representation for localized regions (e.g., kernel neighborhoods) of a digital image.

The burst image enhancement system 102 can sample from this representation to determine learned kernel weights for any particular sample relative to any particular output pixel. As shown in FIG. 3, and as explained in greater detail below (e.g., in relation to FIG. 4), the burst image enhancement system 102 can generate the local neural implicit representation 310 utilizing a continuous kernel neural network in the form of a multi-layer perceptron (MLP). In particular, the continuous kernel neural network (e.g., utilizing an embedding neural network as described below in relation to FIG. 4) estimates a hidden latent variable that is used to condition a local implicit network representing a reconstruction kernel.

Moreover, the burst image enhancement system 102 can utilize anti-aliasing and sampling techniques to generate output pixels from the local neural implicit representation 310 for any particular output pixel. In particular, the burst image enhancement system 102 can apply the continuous reconstruction kernels to local sample neighborhoods and resample the continuous representation at a desired resolution. For instance, the burst image enhancement system 102 can generate learned kernel weights for samples relative to a kernel neighborhood of a given output pixel (an output pixel selected for a particular output resolution) utilizing the continuous kernel neural network. Moreover, the burst image enhancement system 102 can combine the output pixels to generate the enhanced digital image 312.

Figure 4:
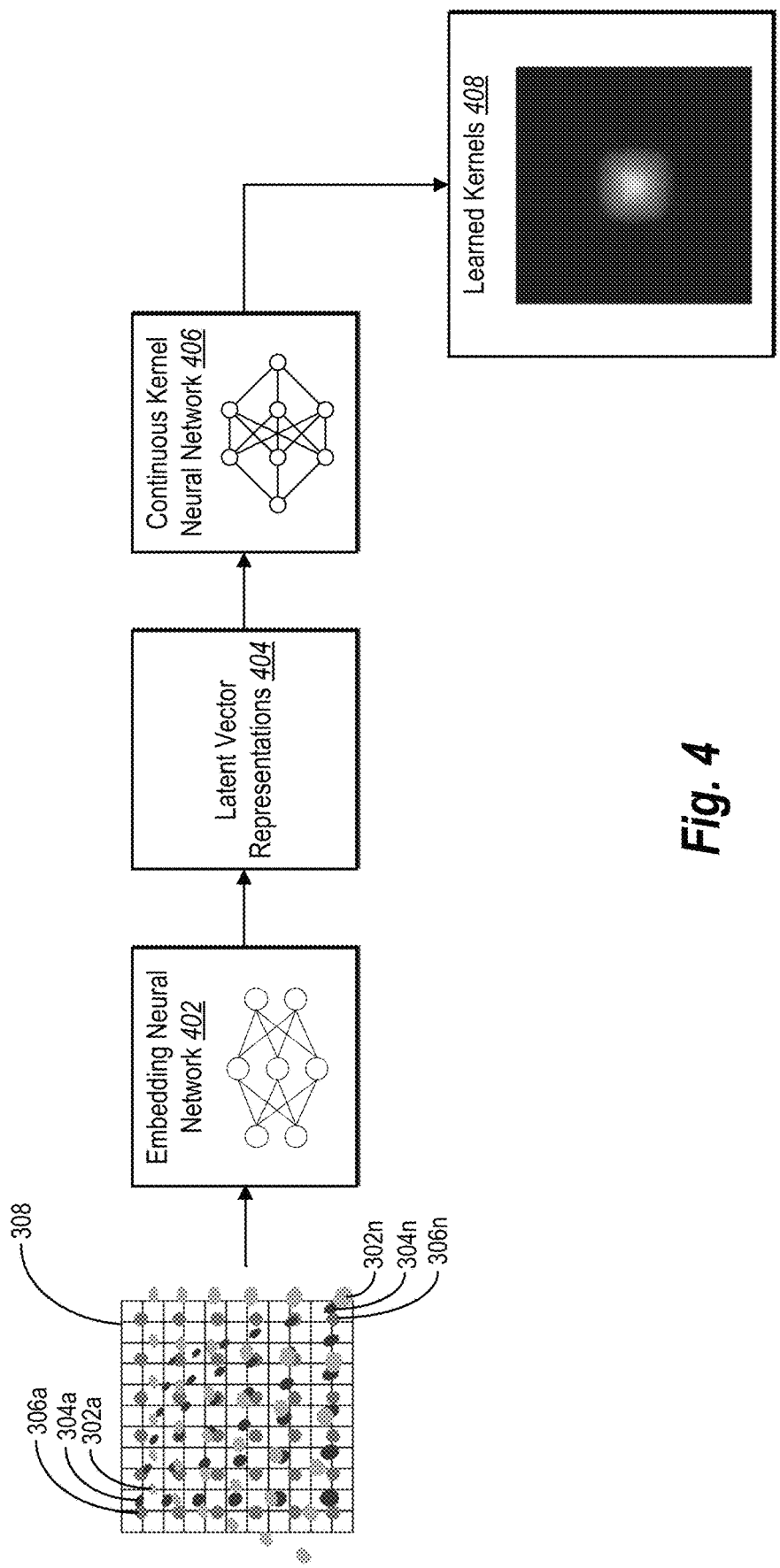
FIG. 4 illustrates a schematic diagram of an embedding neural network generating latent vectors and a continuous kernel neural network generating learned kernels from the latent vectors in accordance with one or more embodiments.

For example, FIG. 4 illustrates utilizing an embedding neural network 402 and a continuous kernel neural network 406 to generate learned kernels 408 (e.g., learned kernels comprising continuous learned kernel weights for various kernel neighborhoods). As shown, the burst image enhancement system 102 utilizes the samples 302a-302n, 304a-304n, and 306a-306n and the embedding neural network 402 to generate latent vector representations 404. The burst image enhancement system 102 then utilizes the continuous kernel neural network 406 to generate the learned kernels 408.

In one or more embodiments, the embedding neural network 402 generates the latent vector representations 404 by analyzing a local subset of the input samples. For example, the embedding neural network 402 can generate a first latent vector by analyzing a first set of samples that fall within a first kernel neighborhood. The embedding neural network 402 can then generate a second latent vector by analyzing a second set of samples that fall within a second kernel neighborhood.

In some implementations, the embedding neural network 402 generates the latent vectors by analyzing additional image information. For example, rather than relying only on samples, the embedding neural network 402 can analyze any portion of a burst digital image that falls within a kernel neighborhood. In some implementations, the embedding neural network 402 generates an overall embedding from all of the burst digital images (or from all of the samples 302a-302n, 304a-304n, and 306a-306n). The burst image enhancement system 102 can then utilize localized portions of the overall embedding for particular kernel neighborhoods (e.g., extract a subportion of the overall embedding that falls within a particular kernel neighborhood).

The embedding neural network 402 can include a variety of different neural network architectures. For example, in one or more embodiments, the burst image enhancement system 102 utilizes one or more convolutional neural network layers to process samples and/or burst digital images to generate the latent vector representations 404. To illustrate, in some embodiments, the burst image enhancement system 102 utilizes the PointNet model architecture as described by C. R. Qi, H. Su, K. Mo, and L. J. Guibas in Pointnet: Deep learning on point sets for 3d classification and segmentation, Proceedings of the IEEE conference on computer vision and pattern recognition, pages 652-660, 2017, which is incorporated by reference herein in its entirety.

Because the burst image enhancement system 102 utilizes the embedding neural network 402, the latent vector representations 404 capture information about particular kernel neighborhoods (e.g., a sample neighborhood for a particular output pixel). The latent vector representations 404 also capture information about the local image (e.g., presence of an edge, high detail area, low frequency area).

As illustrated in FIG. 4, the continuous kernel neural network 406 utilizes the latent vector representations 404 to generate the learned kernels 408. In particular, the latent code of the embedding neural network 402 conditions the continuous kernel neural network 406 based on the samples. Thus, for a first kernel neighborhood, a first latent vector based on a first set of samples, informs the continuous kernel neural network 406 in generating a particular learned kernel (e.g., a continuous kernel specific to the first kernel neighborhood). In addition, for a second kernel neighborhood, a second latent vector based on a second set of samples, informs the continuous kernel neural network 406 in generating an additional learned shape (e.g., another continuous kernel specific to the second kernel neighborhood). Accordingly, the continuous kernel neural network 406 can model continuous (non-Gaussian) kernels for kernel neighborhoods corresponding to output pixels for an enhanced digital image.

The burst image enhancement system 102 can utilize a variety of model architectures for the continuous kernel neural network 406. For example, in one or more embodiments, the burst image enhancement system 102 represents kernels using a Multi-Layer Perceptron (MLP) with ReLU or sine activations. To illustrate, in some embodiments, the burst image enhancement system 102 utilizes a model architecture described by V. Sitzmann, J. Martel, A. Bergman, D. Lindell, and G. Wetzstein in Implicit neural representations with periodic activation functions, Advances in Neural Information Processing Systems, 33, 2020, which is incorporated herein by reference in its entirety.

As illustrated in FIG. 4, the learned kernels 408 reflect a continuous set of learned kernel weights. Indeed, the burst image enhancement system 102 can model a learned kernel comprising a set of continuous learned kernel weights for each kernel neighborhood (and corresponding output pixel) of an enhanced digital image. Notably, the learned kernels 408 can take a variety of shapes or forms. Indeed, as illustrated, a kernel can include non-Gaussian weight distributions to flexibly accommodate the unique characteristics or contexts of individual localized regions.

Although FIG. 4 illustrates the embedding neural network 402 and the continuous kernel neural network 406 as separate models, the burst image enhancement system 102 can implement the embedding neural network 402 as part of the continuous kernel neural network 406. For example, the embedding neural network 402 can be implemented to generate a latent code z within the continuous kernel neural network 406.

As mentioned above, the burst image enhancement system 102 can utilize latent vector representations and continuous displacement vectors in generating learned kernel weights. For example, FIG. 5 illustrates utilizing a continuous displacement vector 508 and a latent vector representation 512 for a kernel neighborhood 502 to generate a learned kernel weight 510 utilizing the continuous kernel neural network 406.

Figure 5:
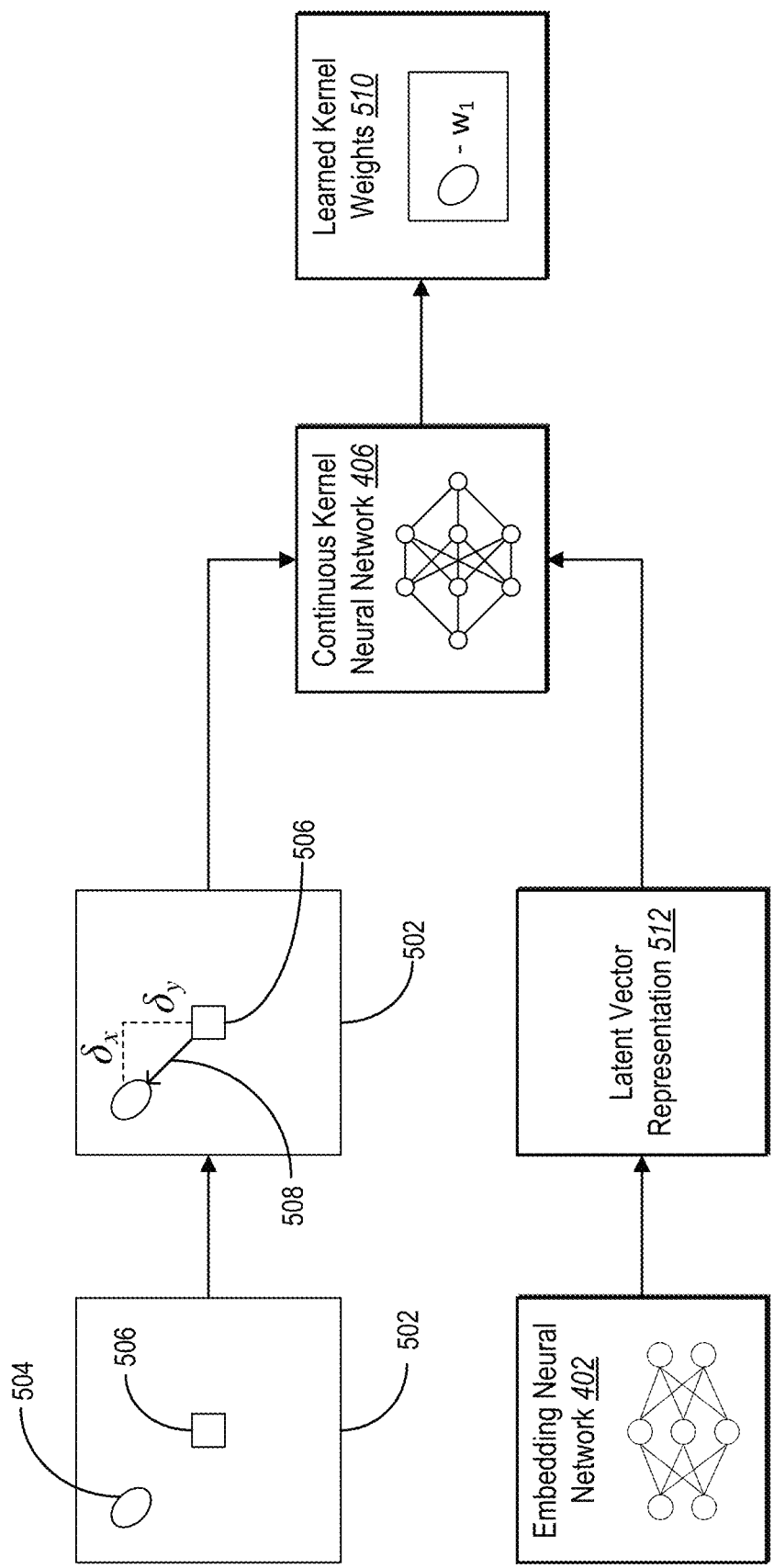
FIG. 5 illustrate a schematic diagram of utilizing a continuous kernel neural network to generate a learned kernel weight for an output pixel based on a latent vector representation and continuous displacement vector in accordance with one or more embodiments.

In particular, FIG. 5 illustrates the kernel neighborhood 502 corresponding to an output pixel 506. As mentioned, a kernel neighborhood reflects a localized region for a sampled output pixel of an enhanced digital image at a particular resolution. Although FIG. 5 illustrates a particular size and shape (e.g., rectangle) for the kernel neighborhood 502, the burst image enhancement system 102 can utilize a variety of different sizes and shapes for the kernel neighborhood 502 (e.g., larger or smaller rectangles, triangles, ovals, etc.). In some implementations, the burst image enhancement system 102 selects the size/shape of the kernel neighborhood 502 based on user input, characteristics of the digital image (e.g., image quality, image resolution) and/or characteristics of the enhanced digital image (e.g., desired quality, desired resolution).

As shown, the kernel neighborhood 502 includes a sample 504 from a burst digital image. The burst image enhancement system 102 can determine the continuous displacement vector 508 based on the distance and direction of the sample 504 relative to the output pixel 506. Indeed, as shown the burst image enhancement system 102 determines a vertical displacement vector, $\delta_y$, and a horizontal displacement vector, $\delta_x$, which define the continuous displacement vector 508.

As mentioned above, the continuous displacement vector 508 need not fall within discrete, pre-defined cells or pixel values. Indeed, because the burst image enhancement system 102 generates the sample 504 utilizing an alignment algorithm (as described in relation to FIG. 3), the sample 504 may have an irregular position relative to the output pixel 506. The continuous displacement vector 508 can thus describe the relative position between the sample 504 and the output pixel 506 despite the fact that the sample 504 does not fall within a discrete cell or pixel location. This approach allows the burst image enhancement system 102 to maintain accurate information from the burst digital image from which the sample 504 is drawn (e.g., without resampling to align the sample to particular coordinate positions).

As shown, the burst image enhancement system 102 utilizes the continuous kernel neural network 406 to process both the continuous displacement vector 508 and the latent vector representation 512 and generate the learned kernel weight 510. As described above in relation to FIG. 4, the latent vector representation 512 reflects localized characteristics of the kernel neighborhood. Indeed, the embedding neural network 402 process information from the burst digital images (e.g., the sample 504) to generate the latent vector representation 512. Thus, the continuous kernel neural network 406 analyzes these localized features in combination with the continuous displacement vector 508 to generate the learned kernel weight 510.

As described above in relation to FIG. 4, the continuous kernel neural network 406 models a learned kernel for each kernel neighborhood, and the learned kernel represents learned kernel weights for various positions within the kernel neighborhood. Accordingly, the learned kernel weight 510 reflects a sampling of the learned kernel for the kernel neighborhood 502 at the relative location of the sample 504 defined by the continuous displacement vector 508. Indeed, as illustrated in FIG. 5, the learned kernel weight 510 reflects a particular weight corresponding to the sample 504 relative to the output pixel 506 for the kernel neighborhood 502.

Figure 6:
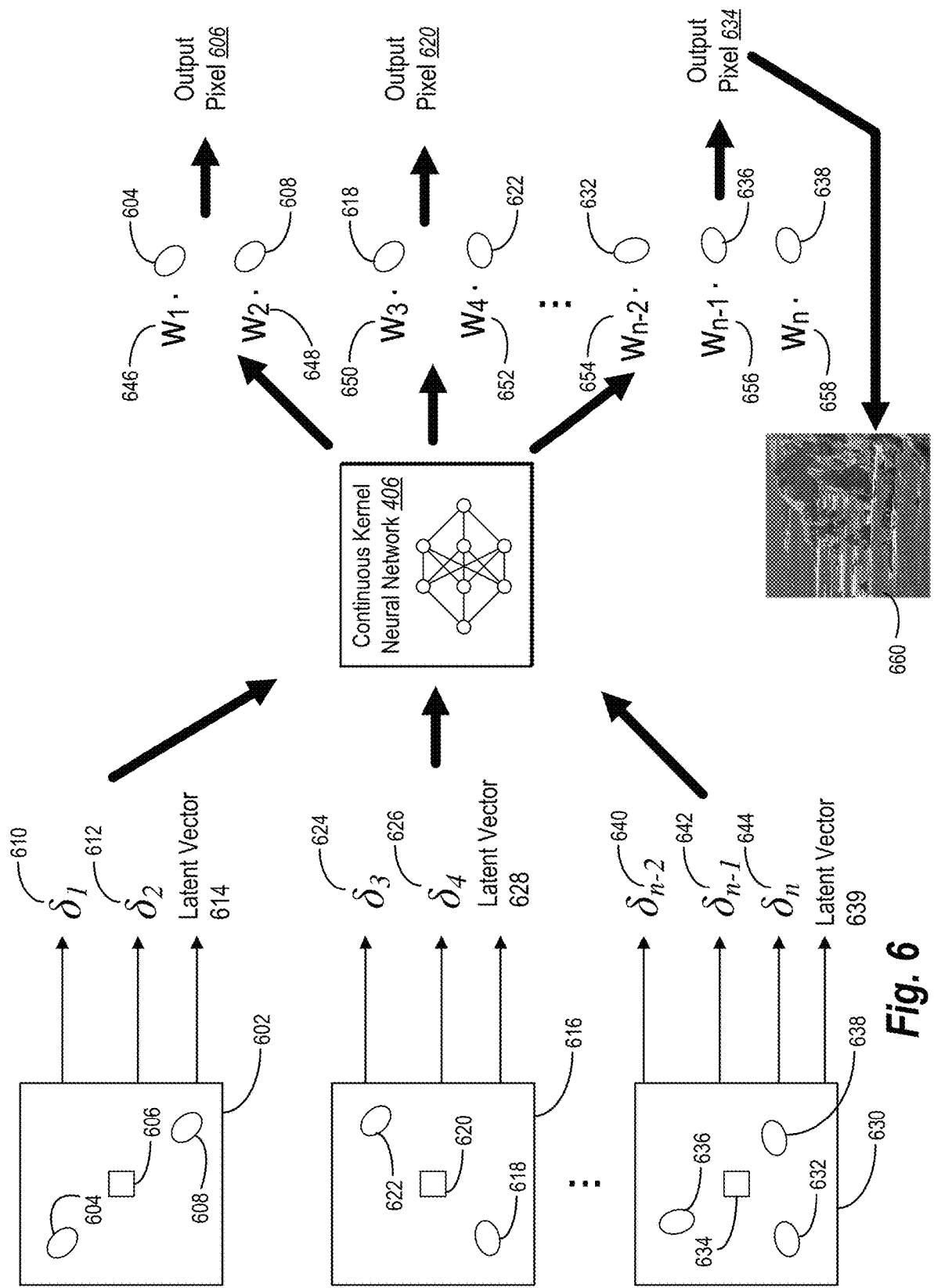
FIG. 6 illustrates a schematic diagram of utilizing a continuous kernel neural network to generate a plurality of output pixels of an enhanced digital image in accordance with one or more embodiments.

As mentioned, the burst image enhancement system 102 can generate an enhanced digital image by iteratively determining learned kernel weights, combining samples utilizing the learned kernel weights to generate output pixels, and then combining the output pixels to generate an enhanced digital image. For example, FIG. 6 illustrates generating an enhanced digital image 660 from output pixels 606, 620, 634 in accordance with one or more embodiments. In particular, FIG. 6 illustrates utilizing the continuous kernel neural network 406 to generate learned kernel weights 646-658. The burst image enhancement system 102 applies the learned kernel weights 646-658 to corresponding samples 604, 608, 618, 622, 632, 636, and 638 to generate the output pixels 606, 620, 634 and the enhanced digital image 660.

Specifically, FIG. 6 illustrates a first kernel neighborhood 602 for a first output pixel 606. As shown, the first kernel neighborhood 602 includes a first sample 604 (e.g., from a first burst digital image) and a second sample 608 (e.g., from a second burst digital image). The burst image enhancement system 102 determines a first continuous displacement vector 610 between the first sample 604 and the output pixel 606. The burst image enhancement system 102 determines a second continuous displacement vector 612 between the second sample 608 and the output pixel 606. Moreover, as described above, the burst image enhancement system 102 generates a latent vector 614 for the kernel neighborhood 602 (i.e., by applying the embedding neural network 402 to the first sample 604 and the second sample 608 and/or corresponding burst digital images).

As illustrated, the burst image enhancement system 102 utilizes the continuous kernel neural network 406 to model a continuous kernel corresponding to the kernel neighborhood 602. Specifically, the continuous kernel neural network 406 utilizes the first continuous displacement vector 610, the second continuous displacement vector 612, and the latent vector 614 to generate a first learned kernel weight 646 for the first sample 604 and a second learned kernel weight 648 for the second sample 608.

Furthermore, the burst image enhancement system 102 generates the output pixel 606 by combining the first sample 604 and the second sample 608 according to the first learned kernel weight 646 and the second learned kernel weight 648. For example, the burst image enhancement system 102 can determine a weighted average (or another combination, such as an addition, ratio, or multiplication) between pixel colors of the first sample 604 and the second sample 608 by applying the first learned kernel weight 646 and the second learned kernel weight 648 to the pixel colors. The burst image enhancement system 102 can utilize this combination of pixel colors for the output pixel 606.

As shown, the burst image enhancement system 102 can perform a similar process for additional output pixels. Indeed, the burst image enhancement system 102 can generate learned kernel weights for samples (from the same or different burst digital images) in additional kernel neighborhoods of additional output pixels. Thus, as illustrated, the burst image enhancement system 102 identifies output pixels 620, 634 of kernel neighborhoods 616, 630. The burst image enhancement system 102 identifies samples 618, 622, 632, 636, and 638 (e.g., from the first burst digital image, the second burst digital image, and/or other burst digital images) and determines continuous displacement vectors 624, 626, 640, 642, and 644 with corresponding latent vectors 628, 639.

The burst image enhancement system 102 utilizes the continuous kernel neural network 406 to generate the learned kernel weights 650-658 from the continuous displacement vectors 624, 626, 640, 642, and 644 and the corresponding latent vectors 628, 639. Moreover, as shown, the burst image enhancement system 102 combines the samples 618, 622 utilizing the learned kernel weights 650, 652 to generate the output pixel 620. The burst image enhancement system 102 also combines the samples 636, 638 utilizing the learned kernel weights 656, 658 to generate the output pixel 634.

As mentioned above, samples in some kernel neighborhoods can come from the same or different burst digital images as other kernel neighborhoods. Thus, for example, the burst image enhancement system 102 can generate the sample 604 from a first digital image, generate the sample 608 from the first digital image, and generate the sample 636 from the first digital image. Similarly, the burst image enhancement system 102 can generate the sample 622 and the sample 638 from a second digital image.

As illustrated in FIG. 6, the burst image enhancement system 102 also combines the output pixels 606, 620, 634 to generate the enhanced digital image 660. Indeed, the burst image enhancement system 102 can generate output pixels for every location in the enhanced digital image and combine the output pixels to generate the enhanced digital image 660. Notably, the burst image enhancement system 102 can generate the enhanced digital image 660 at a variety of desired resolutions. For instance, the burst image enhancement system 102 can determine a number and location of output pixels to generate an enhanced digital image at a desired resolution. The burst image enhancement system 102 can then utilize the approach illustrated in FIG. 6 to determine pixel values for the output pixels at the desired resolution.

Indeed, as illustrated in FIG. 6, because the burst image enhancement system 102 generates each output pixel utilizing continuous displacement vectors and continuous kernels, the burst image enhancement system 102 can flexibly generate the enhanced digital image 660 at a variety of different resolutions by choosing the location/number of output pixels (e.g., within the common coordinate system used to align the samples). Thus, the burst image enhancement system 102 can generate the enhanced digital image 660 at a first resolution. In response to user input of a second resolution, the burst image enhancement system 102 can generate an additional enhanced digital image at the second resolution by generating output pixels at the second resolution.

In one or more embodiments, the burst image enhancement system 102 obtains the output pixel value at (x, y) by taking the weighted average of the local sample contributions according to the following:

$$f(x, y) = \frac{\sum_{j=1}^{n} \sum_{k \in N_j} \omega(\delta x_i, \delta y_i, ; z) \cdot f_j(x_i, y_i)}{\sum_{j=1}^{n} \sum_{k \in N_j} \omega(\delta x_i, \delta y_i; z)}$$

where $\mathcal{N}$ is the local neighborhood (i.e., kernel neighborhood) of samples from frame $f_j$ (e.g., a burst digital image) around the output pixel (x, y), ($\delta x_i$, $\delta y_i$) are the displacement vectors (e.g., the continuous displacement vectors) of sample i, and z is a latent code reflecting the local neighborhood (e.g., a latent vector representation generated via the embedding neural network).

Figure 7:
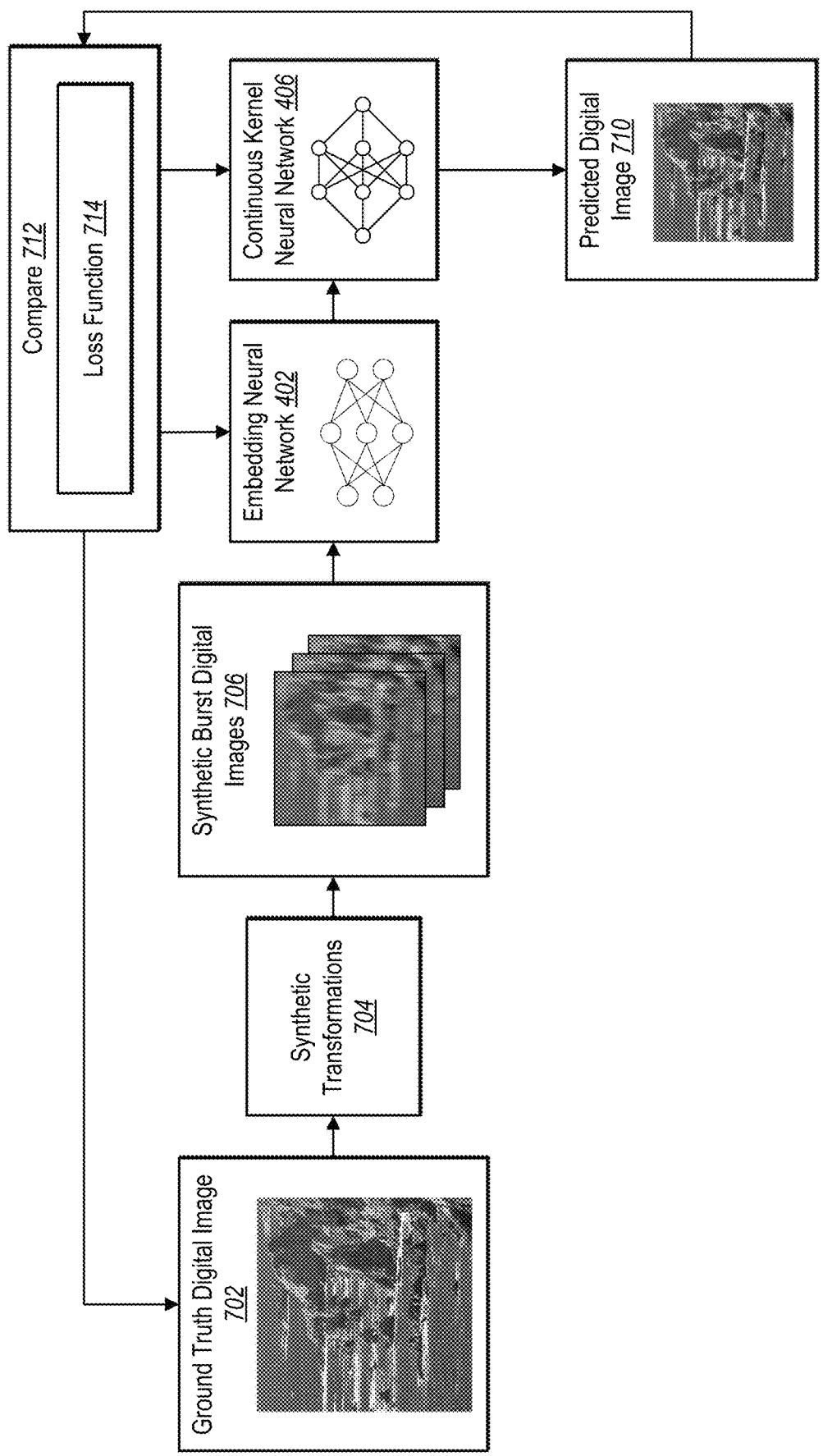
FIG. 7 illustrates a schematic diagram of learning parameters of an embedding neural network and continuous kernel neural network utilizing synthetic training samples in accordance with one or more embodiments.

As mentioned above, the burst image enhancement system 102 can also train a continuous kernel neural network to generate learned kernel weights. For example, FIG. 7 illustrates learning parameters of the embedding neural network 402 and the continuous kernel neural network 406 utilizing synthetic burst digital images 706 in accordance with one or more embodiments.

As shown, the burst image enhancement system 102 can identify a ground truth digital image 702. For example, the burst image enhancement system 102 can select or capture a high-resolution digital image. The burst image enhancement system 102 can then utilize the high-resolution digital image as the ground truth digital image 702 to generate synthetic training images. Indeed, as shown, upon identifying the ground truth digital image 702, the burst image enhancement system 102 applies synthetic transformations 704. By applying the synthetic transformations 704 to the ground truth digital image, the burst image enhancement system 102 can generate synthetic burst digital images 706.

The synthetic transformations 704 can include a variety of digital image transformations. For example, the burst image enhancement system 102 can take shifted samples from the ground truth digital image 702 (using random affine matrices to simulate camera shake). In some implementations, the synthetic transformations 704 can include translating, cropping, zooming, upsampling, downsampling, blurring, distorting, obscuring, and/or replacing pixels of the ground truth digital image 702. The burst image enhancement system 102 can apply one or more synthetic transformations to the ground truth digital image 702 to generate the synthetic burst digital images 706.

Upon generating the synthetic burst digital images 706, the burst image enhancement system 102 can utilize the embedding neural network 402 and the continuous kernel neural network 406 to generate a predicted digital image 710. In particular, as described above with regard to FIG. 6, the burst image enhancement system 102 can utilize the embedding neural network 402 and the continuous kernel neural network 406 to generate learned kernel weights for samples and combine the samples to generate output pixels of the predicted digital image 710.

As shown in FIG. 7, upon generating the predicted digital image 710, the burst image enhancement system 102 can modify parameters (e.g., learned weights within neural network layers) of the embedding neural network 402 and/or the continuous kernel neural network 406. Specifically, the burst image enhancement system 102 can perform an act 712 of comparing the predicted digital image 710 with the ground truth digital image 702 and modify parameters based on the comparison. For example, the burst image enhancement system 102 performs the act 712 utilizing a loss function 714. The burst image enhancement system 102 can determine a measure of loss utilizing the loss function 714 and modify parameters of the embedding neural network 402 and/or the continuous kernel neural network 406 to reduce the measure of loss (e.g., via back propagation).

In one or more embodiments, the burst image enhancement system 102 minimizes a Mean Square Error term by stochastic gradient descent:

$$\mathcal{L} = \mathbb{E}_f \|f - f_{GT}\|^2$$

where f is the predicted output of an output pixel and $f_{GT}$ is the ground truth pixel value. The burst image enhancement system 102 can utilize a variety of different loss functions such as a mean square error function, a quadratic loss function, an L2 loss function, a mean absolute error/L1 loss function, a cross entropy loss/negative log likelihood function, and/or a perceptual loss.

The burst image enhancement system 102 can iteratively generate predicted digital images (from different sets of synthetic burst digital images) to train the embedding neural network 402 and/or the continuous kernel neural network 406. For example, the burst image enhancement system 102 can identify a variety of high-resolution images portraying different scenes and utilize these digital images as ground truth digital images. The burst image enhancement system 102 can generate different sets of synthetic burst digital images from the high-resolution images. The burst image enhancement system 102 can then repeatedly modify parameters of the embedding neural network 402 and/or the continuous kernel neural network 406 and repeat a threshold number of times or until satisfying a threshold measure of loss.

As mentioned above, in addition to learning parameters via synthetic burst digital images, the burst image enhancement system 102 can also utilize real (e.g., authentic, captured) burst digital images to train an embedding neural network and/or continuous kernel neural network. For example, FIG. 8 illustrates learning parameters of the embedding neural network 402 and/or the continuous kernel neural network 406 by dividing burst digital images 802 into test and reference image sets.

As shown, the burst image enhancement system 102 can identify burst digital images 802. For example, the burst image enhancement system 102 can identify the burst digital images 802 from a series of digital images captured via a camera device (e.g., a smartphone). As shown, the burst image enhancement system 102 can utilize this series of digital images to train the embedding neural network 402 and/or the continuous kernel neural network 406.

Figure 8:
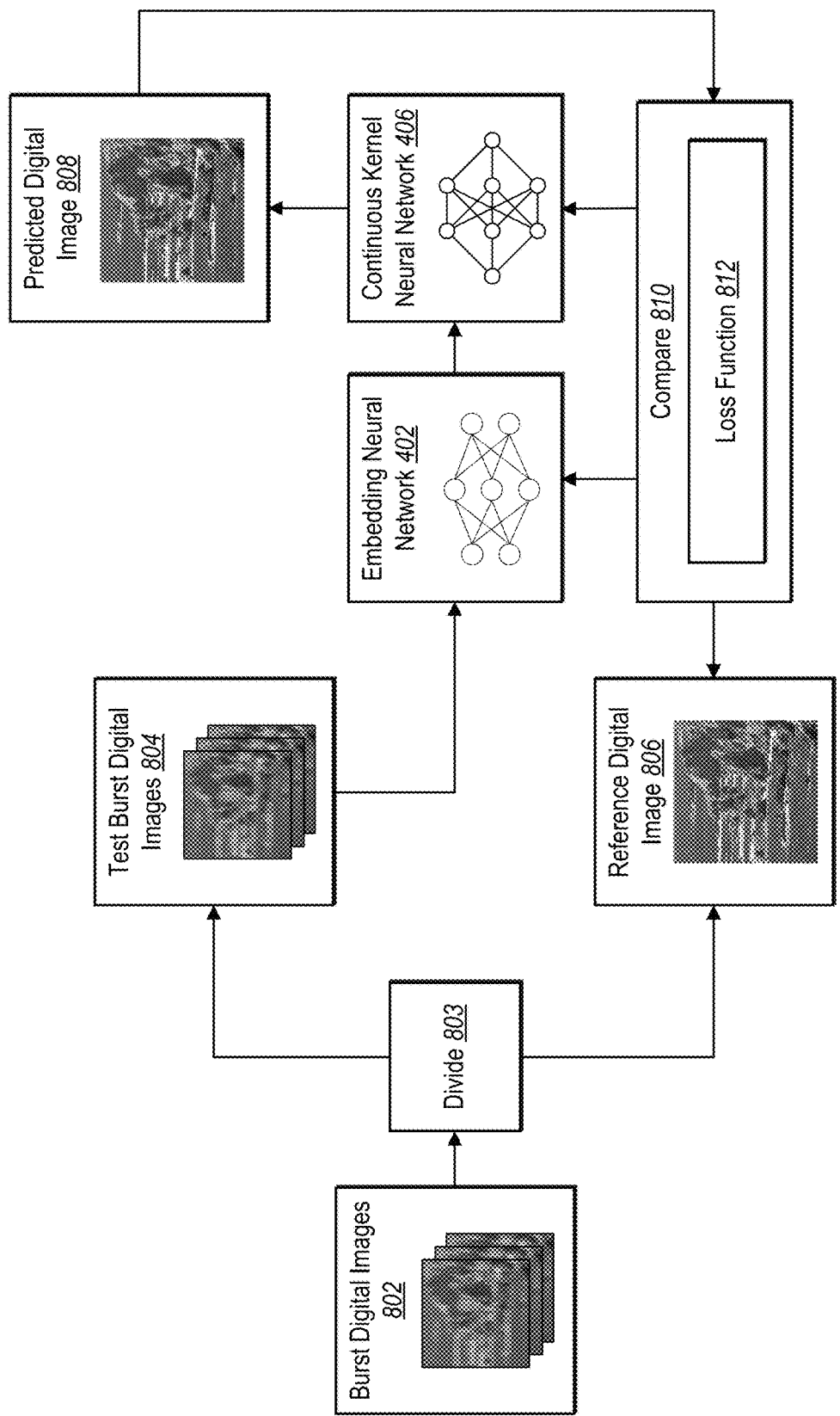
FIG. 8 illustrates a schematic diagram of learning parameters of an embedding neural network and continuous kernel neural network by dividing a plurality of burst digital images in accordance with one or more embodiments.

Specifically, FIG. 8 illustrates the burst image enhancement system 102 performing an act 803 of dividing the burst digital images 802 into test burst digital images 804 and a reference digital image 806. Although FIG. 8 illustrates a single reference digital image, the burst image enhancement system 102 can utilize two or more reference digital images from the burst digital images 802. The burst image enhancement system 102 can perform the act 803 by selecting the reference digital image 806 based on a variety of factors. For example, the burst image enhancement system 102 can select the reference digital image 806 by random sampling from the burst digital images 802. In some embodiments, the burst image enhancement system 102 selects the reference digital image 806 based on digital image contents. For instance, the burst image enhancement system 102 can generate an aesthetics score for each digital image and select the digital image based on the aesthetics score (e.g., the highest aesthetics score). Similarly, the burst image enhancement system 102 can select the reference digital image 806 based on the number of identified artifacts and/or the amount/degree of blurring (e.g., the digital image with the fewest artifacts).

In one or more embodiments, the burst image enhancement system 102 selects the test burst digital images. For example, the burst image enhancement system 102 can randomly sample the test burst digital images 804 from the burst digital images 802 and/or select the test burst digital images 804 based on image contents. To illustrate, the burst image enhancement system 102 can select digital images that have occlusions, blurring, or other artifacts.

As shown in FIG. 8, the burst image enhancement system 102 can utilize the embedding neural network 402 and the continuous kernel neural network 406 to generate a predicted digital image 808 and modify neural network parameters. Indeed, as described in relation to FIG. 7, the burst image enhancement system 102 can generate output pixels for the predicted digital image 808. The burst image enhancement system 102 can then perform an act 810 of comparing the predicted digital image 808 (utilizing the loss function 812) with the reference digital image 806. Based on this comparison, the burst image enhancement system 102 can modify parameters of the embedding neural network 402 and/or the continuous kernel neural network 406.

Thus, as shown in FIG. 8, the burst image enhancement system 102 can train the embedding neural network 402 and the continuous kernel neural network 406 by utilizing a captured set of burst digital images. Accordingly, in some embodiments, the burst image enhancement system 102 can avoid using simulated data by capturing real image bursts and, for each burst, split the frames into input and target images. Thus, the burst image enhancement system 102 can use the pixel values at known locations from the first group to supervise a reconstruction from samples in the second group.

As mentioned above, the burst image enhancement system 102 can accurately model continuous (non-Gaussian) kernels to improve the accuracy, flexibility, and efficiency of implementing systems. Researchers have conducted experiments to verify improvements of the burst image enhancement system 102 in accordance with one or more embodiments. For example, FIG. 9A illustrates results from an experimental task of learning to recover a single known, stationary interpolation kernel (e.g. bilinear, bicubic), by optimizing reconstruction loss on a dataset of synthetic images.

Figure 9A:
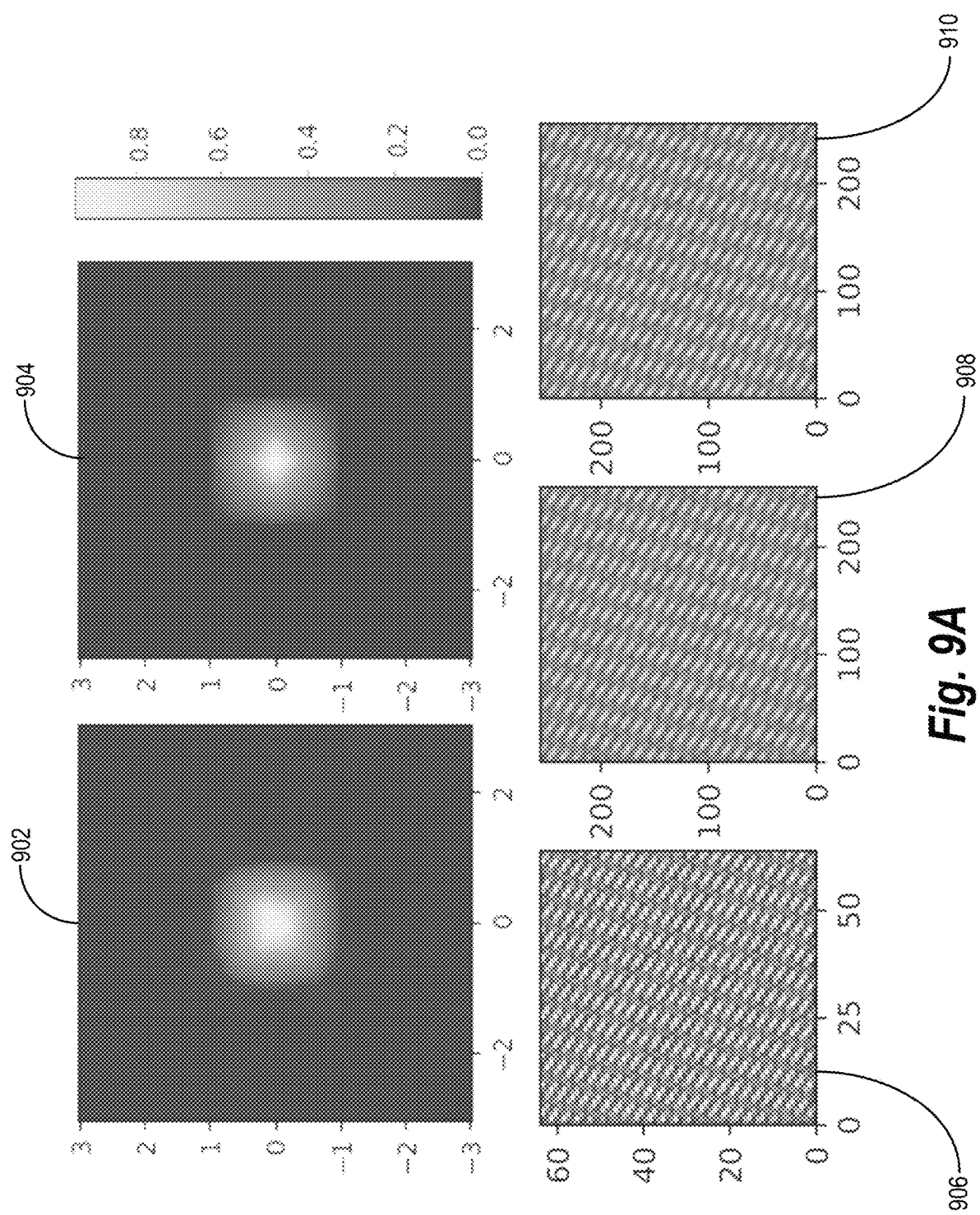
FIGS. 9A-9B illustrate experimental results from learning continuous kernel representations utilizing a continuous kernel neural network in accordance with one or more embodiments.

FIG. 9A shows an instance of this experiment. Specifically, FIG. 9A shows the interpolation kernel 902 learned by the experimental embodiment of the burst image enhancement system 102 next to the ground truth kernel 904. A ground truth digital image 908 was generated from an original signal 906. The example implementation of the burst image enhancement system 102 generated the interpolation image 910. As illustrate, the interpolation image 910 accurately matches the ground truth digital image 908. Moreover, the interpolation kernel 902 aligns well with the ground truth kernel 904 illustrating the accuracy of the proposed approach.

Figure 9B:
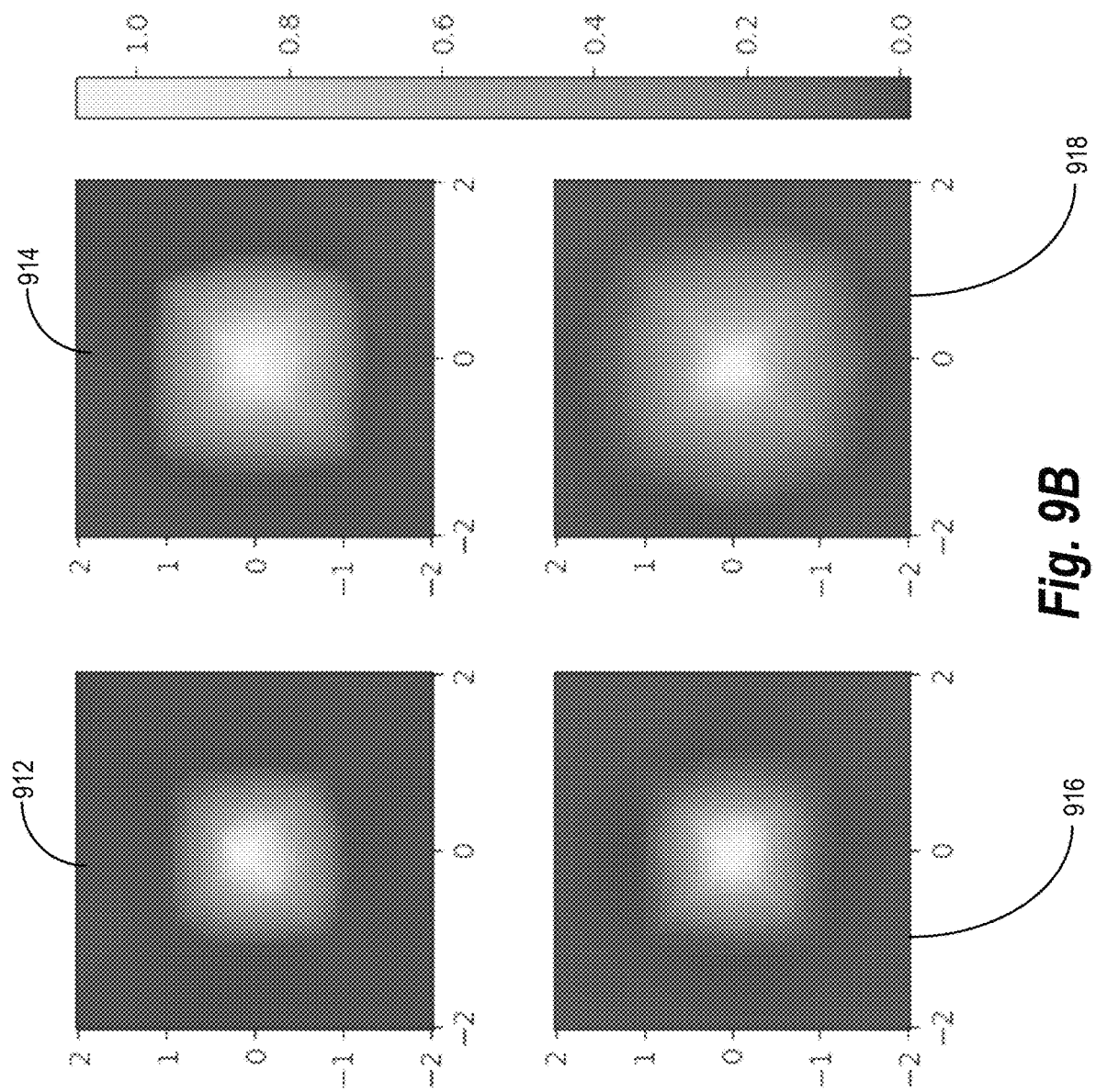

To validate the conditioning mechanism described above, researchers also expanded the foregoing experiment by adding a simplified latent variable. In particular, researchers used four fixed ground truth kernels (bilinear or bicubic, with varying filter footprints). To each kernel the researchers mapped a corresponding, fixed latent code z. Researchers sub-divided the training input/reference image pairs into four quadrants and assigned one of the four kernels to each quadrant. Researchers then trained an experimental implementation of the burst image enhancement system 102 to learn the spatially varying kernel assignment, by observing input/output pairs. FIG. 9B shows a set of kernels learned by the experimental model on this task.

In particular, FIG. 9B illustrates the four kernels 912, 914, 916, and 918 learned by the experimental implementation of the burst image enhancement system 102. As shown, experimental embodiment of the burst image enhancement system 102 learned the kernel 912 (tent-shaped kernel, scale 1), the kernel 914 (tent-shaped kernel, scale 1.8), the kernel 916 (cubic-shaped kernel, scale 1), and the kernel 918 (cubic-shaped kernel, scale 1.5). Accordingly, the experimental implementation of the burst image enhancement system 102 accurately learned different continuous kernel shapes conditioned on a latent code/vector that differed for four different regions. Moreover, as illustrated above with regard to FIG. 2, the burst image enhancement system 102 can also generate high-resolution, enhanced digital images that accurately reflect the underlying scene portrayed in low-resolution burst digital images.

Figure 10:
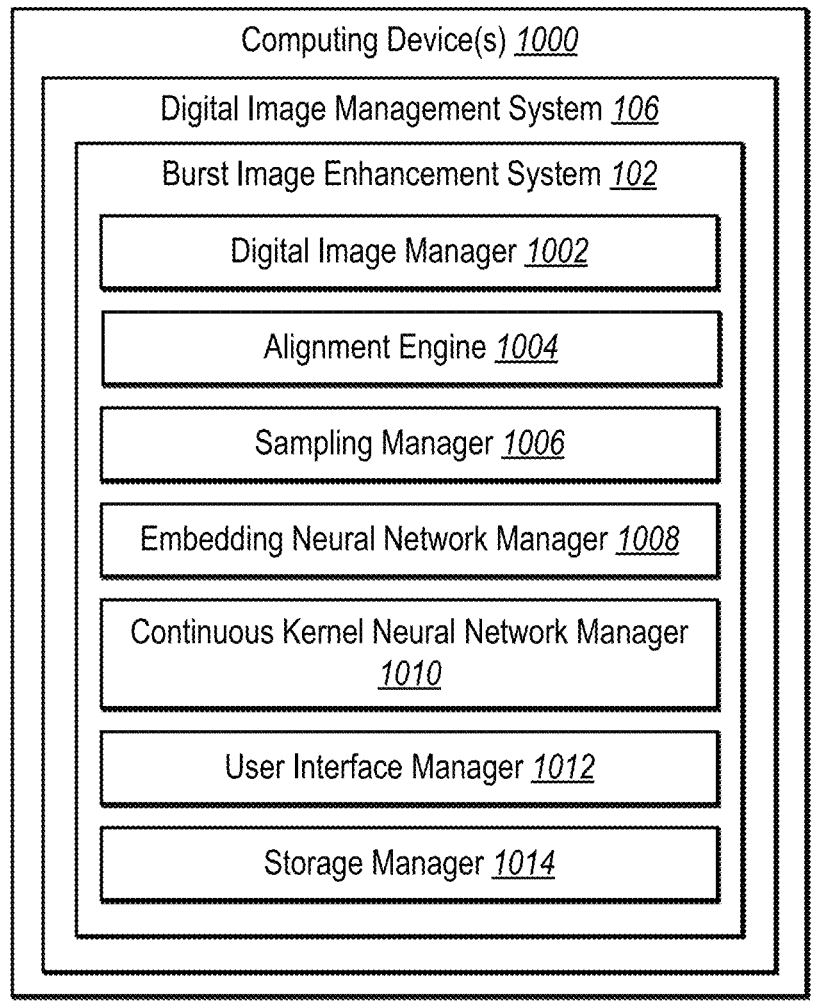
FIG. 10 illustrates a schematic diagram of a burst image enhancement system in accordance with one or more embodiments.

Looking now to FIG. 10, additional detail will be provided regarding components and capabilities of the burst image enhancement system 102. Specifically, FIG. 10 illustrates an example schematic diagram of the burst image enhancement system 102 on an example computing device 1000 (e.g., one or more of the client device 112 and/or the server(s) 104). As shown in FIG. 10, the burst image enhancement system 102 includes a digital image manager 1002, an alignment engine 1004, a sampling manager 1006, an embedding neural network manager 1008, a continuous kernel neural network manager 1010, a user interface manager 1012, and a storage manager 1014.

As just mentioned, the burst image enhancement system 102 includes the digital image manager 1002. The digital image manager 1002 can collect, identify, retrieve, and/or modify digital images. For example, the digital image manager 1002 can utilize a camera device to collect burst digital images of a scene.

As shown in FIG. 10, the burst image enhancement system 102 also includes the alignment engine 1004. The alignment engine 1004 can align, modify, and/or transform digital images and/or digital image samples (e.g., such that the digital images and/or digital image samples align to a common coordinate system). For example, as discussed above, the alignment engine 1004 can utilize an alignment model to align samples from a digital image to a common coordinate system.

As further illustrated in FIG. 10, the burst image enhancement system 102 also includes sampling manager 1006. The sampling manager 1006 can generate, identify, determine, sample, and/or select samples from a digital image. For example, as discussed above, the sampling manager 1006 can generate samples from burst digital images.

Moreover, as shown, the burst image enhancement system 102 can include the embedding neural network manager 1008. The embedding neural network manager 1008 can learn, train, implement, apply, and/or utilize an embedding neural network. For example, as discussed above, the embedding neural network manager 1008 can train an embedding neural network to generate latent vector representations utilizing supervised learning. The embedding neural network manager 1008 can also utilize an embedding neural network to generate latent vector representations for burst digital images and/or one or more samples.

The burst image enhancement system 102 can also include the continuous kernel neural network manager 1010. The continuous kernel neural network manager 1010 can learn, train, implement, apply, and/or utilize a continuous kernel neural network. For example, as discussed above, the continuous kernel neural network manager 1010 can train a continuous kernel neural network to generate localized, continuous kernels utilizing supervised learning (e.g., utilizing synthesized training digital images and/or real training digital images). The continuous kernel neural network manager 1010 can also utilize a continuous kernel neural network to model continuous kernels and generate learned kernel weights.

As shown, the burst image enhancement system 102 can also include the user interface manager 1012. The user interface manager 1012 can generate, provide, illustrate, and/or render user interfaces and corresponding user interface elements via one or more display devices. For example, the user interface manager 1012 can provide a user interface for display via a client device that illustrates an enhanced digital image generated from a plurality of burst digital images.

In addition, as illustrated in FIG. 10, the burst image enhancement system 102 can also include the storage manager 1014. The storage manager 1014 can include one or more memory devices for storing information related to the burst image enhancement system 102. For instance, the storage manager 1014 can store, recall, and/or maintain learned parameters (e.g., the embedding neural network and/or the continuous kernel neural network), burst digital images, enhanced digital images, image samples, kernels, learned kernel weights and/or output pixels.

In one or more embodiments, each of the components of the burst image enhancement system 102 are in communication with one another using any suitable communication technologies. Additionally, the components of the burst image enhancement system 102 are in communication with one or more other devices including one or more client devices described above. It will be recognized that although the components of the burst image enhancement system 102 are shown to be separate in FIG. 10, any of the subcomponents may be combined into fewer components, such as into a single component, or divided into more components as may serve a particular implementation. Furthermore, although the components of FIG. 10 are described in connection with the burst image enhancement system 102, at least some of the components for performing operations in conjunction with the burst image enhancement system 102 described herein may be implemented on other devices within the environment.

The components of the burst image enhancement system 102 can include software, hardware, or both. For example, the components of the burst image enhancement system 102 can include one or more instructions stored on a computer-readable storage medium and executable by processors (or at least one processor) of one or more computing devices (e.g., the computing device 1000). When executed by the one or more processors, the computer-executable instructions of the burst image enhancement system 102 can cause the computing device 1000 to perform the methods described herein. Alternatively, the components of the burst image enhancement system 102 can comprise hardware, such as a special purpose processing device to perform a certain function or group of functions. Additionally, or alternatively, the components of the burst image enhancement system 102 can include a combination of computer-executable instructions and hardware.

Furthermore, the components of the burst image enhancement system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the burst image enhancement system 102 may be implemented as part of a stand-alone application on a personal computing device or a mobile device. Alternatively, or additionally, the components of the burst image enhancement system 102 may be implemented in any application for displaying, modifying, or identifying digital content, including, but not limited to ADOBE CREATIVE CLOUD, PHOTOSHOP, PHOTOSHOP LIGHTROOM, PHOTOSHOP CAMERA, and PREMIER. The foregoing are either registered trademarks or trademarks of Adobe Inc. in the United States and/or other countries.

FIGS. 1-10 the corresponding text, and the examples provide a number of different systems, methods, and non-transitory computer readable media for generating enhanced digital images from burst digital images. In addition to the foregoing, embodiments can also be described in terms of flowcharts comprising acts for accomplishing a particular result. For example, FIG. 11 illustrates a flowchart of an example sequence or series of acts for generating an enhanced digital image from burst digital images in accordance with one or more embodiments.

Figure 11:
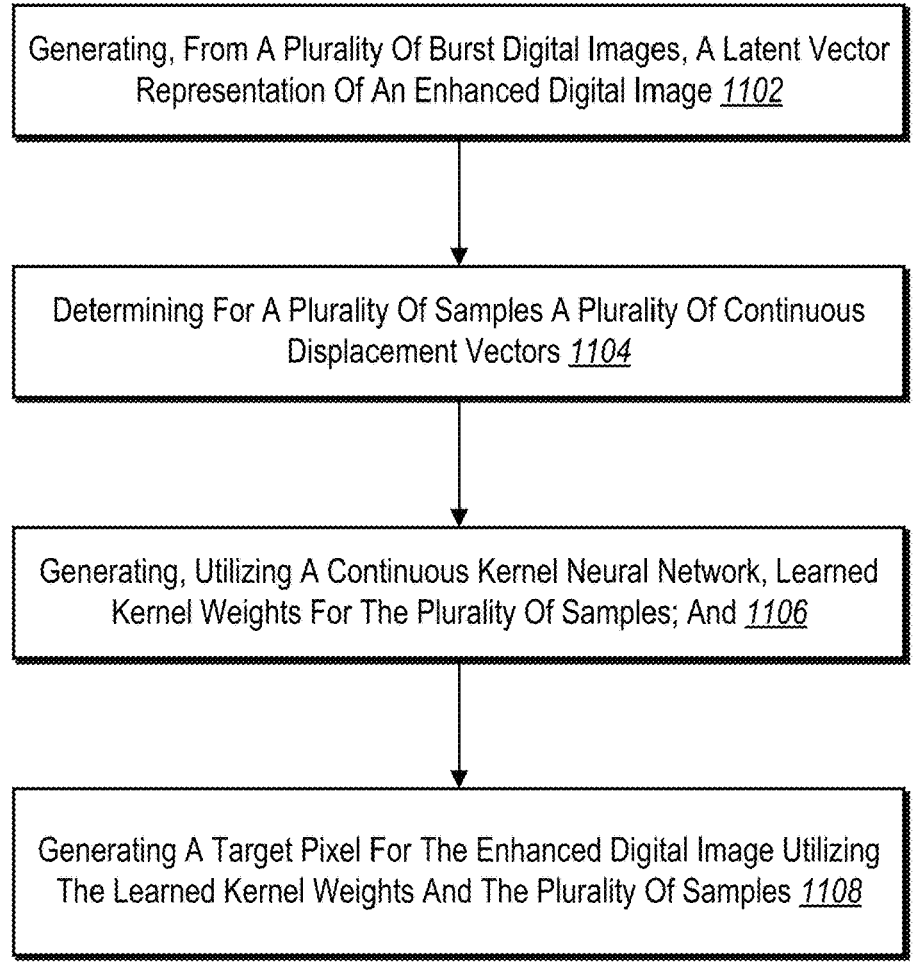
FIG. 11 illustrates a flowchart of a series of acts for generating an enhanced digital image from burst digital images in accordance with one or more embodiments.

While FIG. 11 illustrates specific acts according to particular embodiments, alternative embodiments may omit, add to, reorder, and/or modify any of the acts shown in FIG. 11. The acts of FIG. 11 can be performed as part of a method. Alternatively, a non-transitory computer readable medium can comprise instructions, that when executed by one or more processors, cause a computing device to perform the acts of FIG. 11. In still further embodiments, a system can perform the acts of FIG. 11. Additionally, the acts described herein may be repeated or performed in parallel with one another or in parallel with different instances of the same or other similar acts.

FIG. 11 illustrates an example series of acts 1100 that includes an act 1102 of generating, from a plurality of burst digital images, a latent vector representation of an enhanced digital image. For example, the act 1102 can include generating, from the plurality of burst digital images, a latent vector representation of a kernel neighborhood of an output pixel of the enhanced digital image.

In addition, as shown in FIG. 11 the series of acts 1100 also includes an act 1104 of determining for a plurality of samples a plurality of continuous displacement vectors. For example, the act 1104 can include determining for a plurality of samples of the plurality of burst digital images within the kernel neighborhood of the output pixel, a plurality of continuous displacement vectors. In one or more embodiments, the act 1104 includes generating, utilizing an alignment model, the samples by aligning samples from the plurality of burst digital images to a common coordinate system without resampling. Indeed, the act 1104 can include generating, utilizing an alignment algorithm, a set of samples from the plurality of burst digital images.

In some embodiments, the act 1104 includes determining a first continuous displacement vector between the output pixel and a first sample of a first digital image of the plurality of burst digital images; and determining a second continuous displacement vector between the output pixel and a second sample of the first digital image of the plurality of burst digital images.

Moreover, FIG. 11 shows that the series of acts 1100 also includes an act 1106 of generating, utilizing a continuous kernel neural network, learned kernel weights for the plurality of samples. For example, the act 1106 can include generating, utilizing a continuous kernel neural network, learned kernel weights for the plurality of samples from the plurality of continuous displacement vectors and the latent vector representation of the kernel neighborhood of the output pixel.

In some embodiments, the act 1106 includes generating a first learned kernel weight for the first sample of the first digital image utilizing the continuous kernel neural network based on the first continuous displacement vector and the latent vector representation of the kernel neighborhood of the output pixel; and generating a second learned kernel weight for the second sample of the first digital image utilizing the continuous kernel neural network based on the second continuous displacement vector and the latent vector representation of the kernel neighborhood of the output pixel. In one or more embodiments, the act 1106 includes utilizing the continuous kernel neural network to generate a learned kernel weight for a sample of a digital image of the plurality of burst digital images from a non-Gaussian continuous kernel representation corresponding to the kernel neighborhood.

As illustrated in FIG. 11, the series of acts 1100 also includes an act 1108 of generating an output pixel for the enhanced digital image utilizing the learned kernel weights and the plurality of samples. For example, the act 1108 can include generating the output pixel for the enhanced digital image from the plurality of burst digital images utilizing the learned kernel weights and the plurality of samples. In some embodiments, the act 1108 includes generating the output pixel for the enhanced digital image by combining the first sample of the first digital image and the second sample of the first digital image utilizing the first learned kernel weight and the second learned kernel weight.

The act 1108 can include generating an enhanced digital image from the set of samples utilizing the learned kernel weights. Moreover, generating the enhanced digital image form the set of samples utilizing the learned kernel weights can include: generating an output pixel by combining a first sample of a first digital image with a second sample of the first digital image utilizing a first learned kernel weight and a second learned kernel weight.

In some implementations, the series of acts 1100 can also include providing the enhanced digital image for display via the client device. Moreover, the series of acts can include receiving a plurality of burst digital images captured via a client device.

In some implementations the series of acts 1100 further includes generating a first learned kernel weight for a first digital image of the plurality of burst digital images; and generating a second learned kernel weight for a second digital image of the plurality of burst digital images. Moreover, generating the output pixel can include combining the first learned kernel weight for the first digital image and the second learned kernel weight for the second digital image.

The series of acts 1100 can also include generating, from the plurality of burst digital images, an additional latent vector representation of an additional kernel neighborhood of an additional output pixel of the enhanced digital image; and generating, utilizing the continuous kernel neural network, additional learned kernel weights for an additional plurality of samples for the additional output pixel from the additional latent vector representation. Moreover, the series of acts 110 can include generating the additional output pixel from the plurality of burst digital images utilizing the additional learned kernel weights; and generating the enhanced digital image utilizing the output pixel and the additional output pixel.

In one or more implementations, the series of acts 1100 includes: generating, utilizing the embedding neural network, a first latent vector representation of a first kernel neighborhood of a first output pixel and a second latent vector representation of a second kernel neighborhood of a second output pixel; determining, for the first output pixel utilizing the continuous kernel neural network, a first plurality of learned kernel weights for the first kernel neighborhood from the first latent vector representation; determining, for the second output pixel utilizing the continuous kernel neural network, a second plurality of learned kernel weights for the second kernel neighborhood from the second latent vector representation; and generating an enhanced digital image of the scene comprising the first output pixel and the second output pixel utilizing the first plurality of learned kernel weights and the second plurality of learned kernel weights.

The series of acts 1100 can also include determining a first plurality of continuous displacement vectors between the first output pixel and samples within the first kernel neighborhood; and determining, utilizing the continuous kernel neural network, the first plurality of learned kernel weights for the first kernel neighborhood utilizing the first plurality of continuous displacement vectors and the first latent vector representation.

Furthermore, the series of acts 1100 can include determining the first plurality of learned kernel weights by: generating a first learned kernel weight for a first sample of a first digital image utilizing the continuous kernel neural network based on the first latent vector representation; and generating a second learned kernel weight for a second sample of the first digital image utilizing the continuous kernel neural network based the first latent vector representation.

Moreover, the series of acts 1100 can include generating the first output pixel for the enhanced digital image by combining the first sample of the first digital image and the second sample of the first digital image utilizing the first learned kernel weight and the second learned kernel weight. In some embodiments, the series of acts can include generating the first output pixel for the enhanced digital image utilizing a first set of learned kernel weights for a first digital image of the plurality of burst digital images and a second set of learned kernel weights for a second digital image of the plurality of burst digital images.

In some implementations, the series of acts 1100 includes learning parameters of the embedding neural network and the continuous kernel neural network by: dividing a set of burst digital images portraying the scene into the plurality of burst digital images and one or more reference burst digital images; and modifying the parameters of the embedding neural network and the continuous kernel neural network based on comparing the enhanced digital image to the one or more reference burst digital images from the set of burst digital images portraying the scene. In some embodiments, the series of acts 1100 includes learning parameters of the embedding neural network and the continuous kernel neural network by: generating the plurality of burst digital images by applying synthetic transformations to a ground truth digital image; and modifying the parameters of the embedding neural network and the continuous kernel neural network based on comparing the enhanced digital image to the ground truth digital image.

In one or more implementations, the series of acts 1100 includes performing a step for generating learned kernel weights from continuous kernel representations based on the set of samples. For instance, the acts and algorithms described above in relation to FIG. 4-6 can comprise the corresponding acts (or structure) for a step for generating learned kernel weights from continuous kernel representations based on the set of samples.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
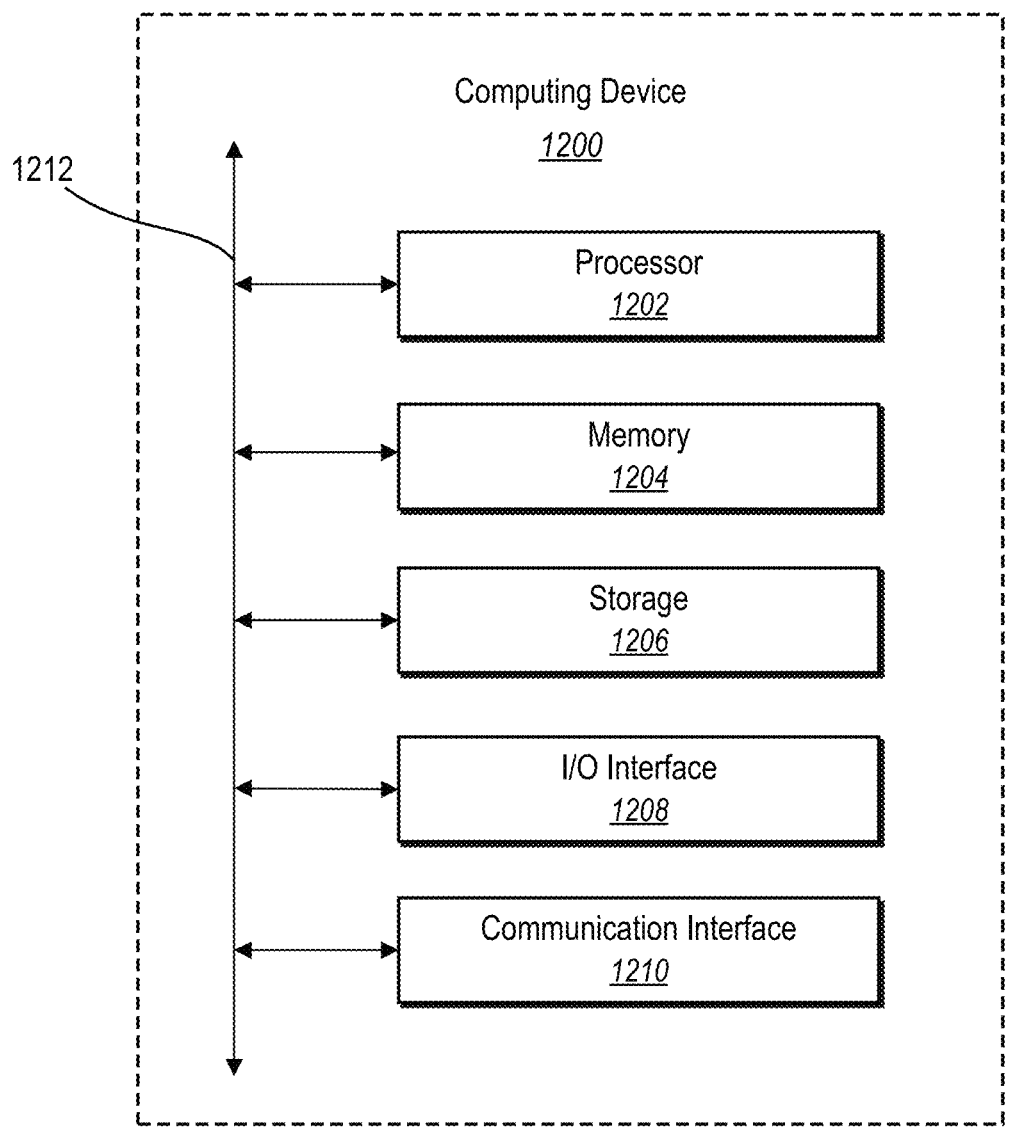
FIG. 12 illustrates a block diagram of an example computing device in accordance with one or more embodiments.

FIG. 12 illustrates, in block diagram form, an example computing device 1200 (e.g., the computing device 1000, the client device 112, and/or the server(s) 104) that may be configured to perform one or more of the processes described above. One will appreciate that the burst image enhancement system 102 can comprise implementations of the computing device 1200. As shown by FIG. 12, the computing device can comprise a processor 1202, memory 1204, a storage device 1206, an I/O interface 1208, and a communication interface 1210. Furthermore, the computing device 1200 can include an input device such as a touchscreen, mouse, keyboard, etc. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, storage device 1206 can comprise a non-transitory storage medium described above. The storage device 1206 may include a hard disk drive (HDD), flash memory, a Universal Serial Bus (USB) drive or a combination of these or other storage devices.

The computing device 1200 also includes one or more input or output ("I/O") devices/interfaces 1208, which are provided to allow a user to provide input to (such as user strokes), receive output from, and otherwise transfer data to and from the computing device 1200. These I/O devices/interfaces 1208 may include a mouse, keypad or a keyboard, a touch screen, camera, optical scanner, network interface, modem, other known I/O devices or a combination of such I/O devices/interfaces 1208. The touch screen may be activated with a writing device or a finger.

The I/O devices/interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1208 is configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 can provide one or more interfaces for communication (such as, for example, packet-based communication) between the computing device and one or more other computing devices 1200 or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause a computing device to generate an enhanced digital image from a plurality of burst digital images by performing operations comprising:
generating, from the plurality of burst digital images, a latent vector representation of a kernel neighborhood of an output pixel of the enhanced digital image;
determining for a plurality of samples of the plurality of burst digital images within the kernel neighborhood of the output pixel, a plurality of continuous displacement vectors;
generating, utilizing a continuous kernel neural network, learned kernel weights for the plurality of samples from the plurality of continuous displacement vectors and the latent vector representation of the kernel neighborhood of the output pixel; and
generating the output pixel for the enhanced digital image from the plurality of burst digital images utilizing the learned kernel weights and the plurality of samples.

2. The non-transitory computer readable medium of claim 1, further comprising instructions that, when executed by the at least one processor, cause the computing device to perform operations comprising generating, utilizing an alignment model, the plurality of samples by aligning image samples from the plurality of burst digital images to a common coordinate system without resampling.

3. The non-transitory computer readable medium of claim 1, wherein determining the plurality of continuous displacement vectors comprises:
determining a first continuous displacement vector between the output pixel and a first sample of a first digital image of the plurality of burst digital images; and
determining a second continuous displacement vector between the output pixel and a second sample of the first digital image of the plurality of burst digital images.

4. The non-transitory computer readable medium of claim 3, wherein generating the learned kernel weights comprises:
generating a first learned kernel weight for the first sample of the first digital image utilizing the continuous kernel neural network based on the first continuous displacement vector and the latent vector representation of the kernel neighborhood of the output pixel; and
generating a second learned kernel weight for the second sample of the first digital image utilizing the continuous kernel neural network based on the second continuous displacement vector and the latent vector representation of the kernel neighborhood of the output pixel.

5. The non-transitory computer readable medium of claim 4, wherein generating the output pixel for the enhanced digital image comprises combining the first sample of the first digital image and the second sample of the first digital image utilizing the first learned kernel weight and the second learned kernel weight.

6. The non-transitory computer readable medium of claim 1, wherein generating the learned kernel weights comprises:
generating a first learned kernel weight for a first digital image of the plurality of burst digital images; and
generating a second learned kernel weight for a second digital image of the plurality of burst digital images.

7. The non-transitory computer readable medium of claim 6, wherein generating the output pixel comprises combining the first learned kernel weight for the first digital image and the second learned kernel weight for the second digital image.

8. The non-transitory computer readable medium of claim 1, wherein generating the learned kernel weights comprises utilizing the continuous kernel neural network to generate a learned kernel weight for a sample of a digital image of the plurality of burst digital images from a non-Gaussian continuous kernel representation corresponding to the kernel neighborhood.

9. The non-transitory computer readable medium of claim 1, further comprising:
generating, from the plurality of burst digital images, an additional latent vector representation of an additional kernel neighborhood of an additional output pixel of the enhanced digital image; and
generating, utilizing the continuous kernel neural network, additional learned kernel weights for an additional plurality of samples for the additional output pixel from the additional latent vector representation.

10. The non-transitory computer readable medium of claim 9, further comprising:
generating the additional output pixel from the plurality of burst digital images utilizing the additional learned kernel weights; and
generating the enhanced digital image utilizing the output pixel and the additional output pixel.

11. A system comprising:
one or more memory devices comprising: a plurality of burst digital images portraying a scene, an embedding neural network, and a continuous kernel neural network; and
one or more processors that are configured to cause the system to:
generate, utilizing the embedding neural network, a first latent vector representation of a first kernel neighborhood of a first output pixel and a second latent vector representation of a second kernel neighborhood of a second output pixel;

determine, for the first output pixel utilizing the continuous kernel neural network, a first plurality of learned kernel weights for the first kernel neighborhood from the first latent vector representation;

determine, for the second output pixel utilizing the continuous kernel neural network, a second plurality of learned kernel weights for the second kernel neighborhood from the second latent vector representation; and generate an enhanced digital image of the scene comprising the first output pixel and the second output pixel utilizing the first plurality of learned kernel weights and the second plurality of learned kernel weights.

12. The system of claim 11, wherein the one or more processors are further configured to learn parameters of the embedding neural network and the continuous kernel neural network by:

dividing a set of burst digital images portraying the scene into the plurality of burst digital images and one or more reference burst digital images; and modifying the parameters of the embedding neural network and the continuous kernel neural network based on comparing the enhanced digital image to the one or more reference burst digital images from the set of burst digital images portraying the scene.

13. The system of claim 11, wherein the one or more processors are further configured to learn parameters of the embedding neural network and the continuous kernel neural network by:

generating the plurality of burst digital images by applying synthetic transformations to a ground truth digital image; and modifying the parameters of the embedding neural network and the continuous kernel neural network based on comparing the enhanced digital image to the ground truth digital image.

14. The system of claim 11, wherein the one or more processors are further configured to:

determine a first plurality of continuous displacement vectors between the first output pixel and samples within the first kernel neighborhood; and determine, utilizing the continuous kernel neural network, the first plurality of learned kernel weights for the first kernel neighborhood utilizing the first plurality of continuous displacement vectors and the first latent vector representation.

15. The system of claim 11, wherein the one or more processors are further configured to determine the first plurality of learned kernel weights by:

generating a first learned kernel weight for a first sample of a first digital image utilizing the continuous kernel neural network based on the first latent vector representation; and generating a second learned kernel weight for a second sample of the first digital image utilizing the continuous kernel neural network based the first latent vector representation.

16. The system of claim 15, wherein the one or more processors are further configured to generate the first output pixel for the enhanced digital image by combining the first sample of the first digital image and the second sample of the first digital image utilizing the first learned kernel weight and the second learned kernel weight.

17. The system of claim 11, wherein the one or more processors are further configured to generate the first output pixel for the enhanced digital image utilizing a first set of learned kernel weights for a first digital image of the plurality of burst digital images and a second set of learned kernel weights for a second digital image of the plurality of burst digital images.

18. A computer-implemented method comprising:

receiving a plurality of burst digital images captured via a client device;

generating, utilizing an alignment algorithm, a set of samples from the plurality of burst digital images;

a step for generating learned kernel weights from continuous kernel representations based on the set of samples; and generating an enhanced digital image from the set of samples utilizing the learned kernel weights.

19. The computer-implemented method of claim 18, further comprising providing the enhanced digital image for display via the client device.

20. The computer-implemented method of claim 18, wherein generating the enhanced digital image form the set of samples utilizing the learned kernel weights comprises: generating an output pixel by combining a first sample of a first digital image with a second sample of the first digital image utilizing a first learned kernel weight and a second learned kernel weight.

* * * * *